(12) United States Patent
Kobayashi et al.

(10) Patent No.: US 8,620,524 B2
(45) Date of Patent: Dec. 31, 2013

(54) VEHICLE DAMPING CONTROL DEVICE

(75) Inventors: Yosuke Kobayashi, Yokohama (JP);
Takeshi Kimura, Yokohama (JP); Yuuki Shiozawa, Sagamihara (JP); Mitsunori Ohta, Machida (JP); Hiroki Sasaki, Tokyo (JP); Akihiro Itoh, Atsugi (JP); Masahiko Yoshizawa, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/699,980

(22) PCT Filed: May 9, 2011

(86) PCT No.: PCT/JP2011/060657
§ 371 (c)(1),
(2), (4) Date: Nov. 26, 2012

(87) PCT Pub. No.: WO2011/148773
PCT Pub. Date: Dec. 1, 2011

(65) Prior Publication Data
US 2013/0073145 A1    Mar. 21, 2013

(30) Foreign Application Priority Data

May 27, 2010   (JP) .................................. 2010-121246
Apr. 8, 2011   (JP) .................................. 2011-085871

(51) Int. Cl.
*B60G 17/00* (2006.01)
*B60G 9/00* (2006.01)
*B62K 27/06* (2006.01)
*B62K 27/08* (2006.01)

(52) U.S. Cl.
USPC .............................. 701/37; 180/902; 280/5.5

(58) Field of Classification Search
USPC ........ 701/37, 38, 39, 111; 180/337, 381, 902; 280/5.5, 5.512, 5.515
See application file for complete search history.

(56) References Cited

U.S. PATENT DOCUMENTS 4,744,589 A    5/1988  Buma et al.
4,749,070 A *  6/1988  Moser et al. ............... 188/266.2

(Continued)

FOREIGN PATENT DOCUMENTS

EP   2 078 653 A1   7/2009
JP   62-80108 A     4/1987
JP   8-295151 A     11/1996
JP   11-217200 A    8/1999

(Continued)

OTHER PUBLICATIONS

USPTO Notice of Allowance, U.S. Appl. No. 13/700,512, Nov. 8, 2013, 14 pages.

*Primary Examiner* — Mary Cheung
*Assistant Examiner* — Rodney Butler
(74) *Attorney, Agent, or Firm* — Foley & Lardner LLP

(57) ABSTRACT

A correction torque command is outputted to a driving/braking torque producing means in accordance with a correction torque to suppress vehicle body spring vibration. When a state of the correction torque amplitude being greater than a predetermined amplitude continues for a given predetermined time, a control apparatus outputs a hunting time correction torque command smaller than a normal time correction toque command. When a state of the correction torque amplitude being smaller than or equal to the predetermined amplitude continues for a first predetermined time, the control apparatus returns the output of correction torque command from the hunting time correction torque command to the normal time correction torque command. The control apparatus continues the output of the hunting time correction torque command if the state in which the correction torque amplitude exceeds the predetermined amplitude continues for the given predetermined time, before the expiration of the first time period.

13 Claims, 13 Drawing Sheets

(56) References Cited

U.S. PATENT DOCUMENTS

| | | | |
|---|---|---|---|
| 6,026,338 A * | 2/2000 | Borschert et al. ............... 701/37 |
| 7,885,740 B2 * | 2/2011 | Izawa et al. ..................... 701/37 |
| 2013/0080012 A1 | 3/2013 | Kobayashi et al. |
| 2013/0090826 A1 | 4/2013 | Ohta et al. |

FOREIGN PATENT DOCUMENTS

| | | |
|---|---|---|
| JP | 2009-127456 A | 6/2009 |
| JP | 2009-247157 A | 10/2009 |
| WO | WO 2011/148739 A1 | 12/2011 |
| WO | WO 2011/152269 A1 | 12/2011 |

* cited by examiner

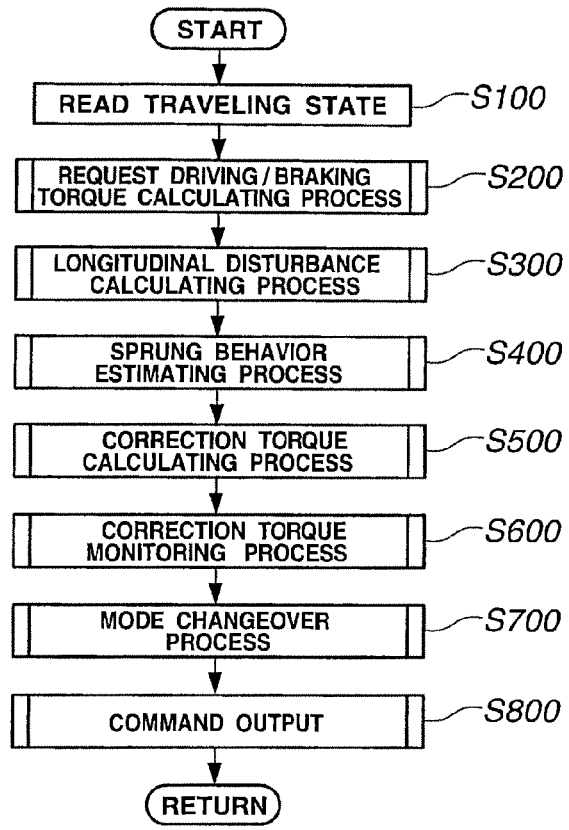
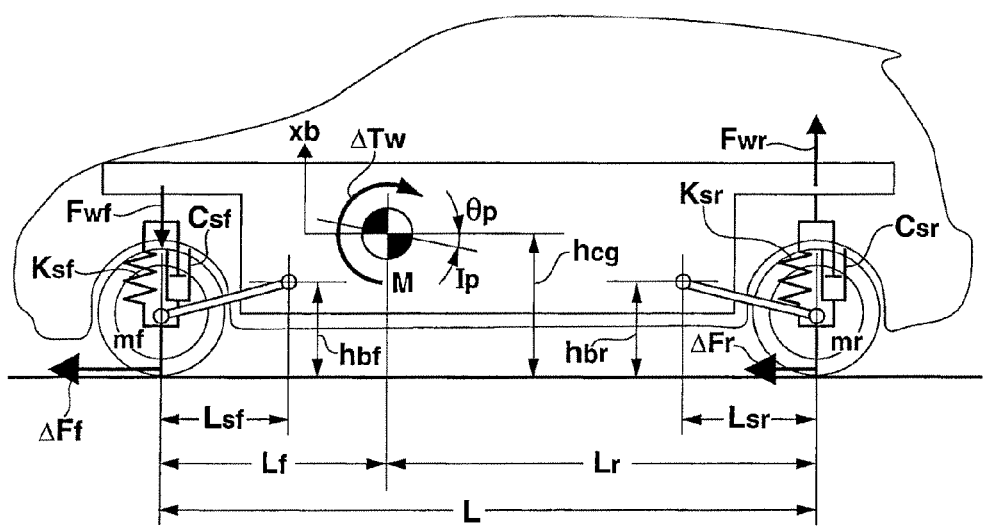

VEHICLE DAMPING CONTROL DEVICE

TECHNICAL FIELD

The present invention relates to a vibration-damping or vibration-suppressing control device or apparatus for suppressing or restraining vibrations produced in a vehicle.

BACKGROUND ART

Patent Document 1 discloses a vibration-suppressing technique to calculate a vibration-suppressing torque for suppressing sprung vibrations by using, as input variables, a driving torque and a wheel speed, and to decrease a control gain when a vibration amplitude of the vibration-suppressing torque continues to be greater than or equal to a predetermined amplitude for a predetermined time length (referred to as "hunting" hereinafter).

However, the technique recited in Patent Document 1 has the following problem. A condition on the road surface's side, such as a rough road, is one of a plurality of factors that produces hunting. In this case, if the output of the control is decreased continuously for a predetermined time period after the occurrence of hunting and then returned, even though hunting is not generated by the return of the output after passage through a rough road, the decreased state of the control output is continued longer than necessary and the vibration damping control does not perform sufficiently.

PRIOR ART LITERATURE

Patent Document(s)

Patent Document 1: JP2009-127456 A

SUMMARY OF THE INVENTION

In view of the above-mentioned problem, it is an object of the present invention to provide a vibration-damping control apparatus capable of restraining hunting without excessive restriction on the vibration-damping control.

To achieve the above-mentioned object, according to the present invention, a correction torque command is outputted to a driving/braking torque producing means, in accordance with a correction torque to suppress a vehicle body sprung (or spring) vibration in the following manner. When a state in which an amplitude of the correction torque is greater than or equal to a predetermined amplitude continues for a predetermined time length, a vibration-damping control apparatus outputs a hunting time correction torque command smaller than a normal time correction torque command. Thereafter, when a state in which the amplitude of the correction torque is smaller than or equal to the predetermined amplitude continues for a first predetermined time length, the vibration-damping control apparatus returns the output of the correction torque command from the hunting time correction torque command to the normal time correction torque command. Furthermore, the vibration-damping control apparatus continues the output of the hunting time correction torque command if the state in which the amplitude of the correction torque exceeds the predetermined amplitude continues for the predetermined time length before the expiration of the first time period.

Thus, the vibration-damping control apparatus restrains the occurrence of hunting with an output decrease of the correction torque against hunting generated temporarily by an external factor, such as a rough road. The vibration-damping control apparatus is configured to cancel the output decrease when it is judged that the hunting is not generated in the calculated correction torque during the output decrease. Therefore, the vibration-damping control apparatus can resume the control promptly after passage through a rough road, and thereby prevent prolongation of the time during which the vibration-damping control is inoperative. Additionally, when the hunting is generated continuously, the vibration-damping control apparatus outputs the hunting time correction torque command continuously. Therefore, the vibration damping control apparatus can restrain reoccurrence of the hunting.

BRIEF DESCRIPTION OF THE DRAWINGS

FIG. 8 is a flowchart showing the sequence of operations of a vibration-damping control process in the controller according to the first embodiment.

FIG. 9 is a schematic view showing a vehicle motion model in the first embodiment.

MODES FOR CARRYING OUT THE INVENTION

Embodiment 1

Figure 1:
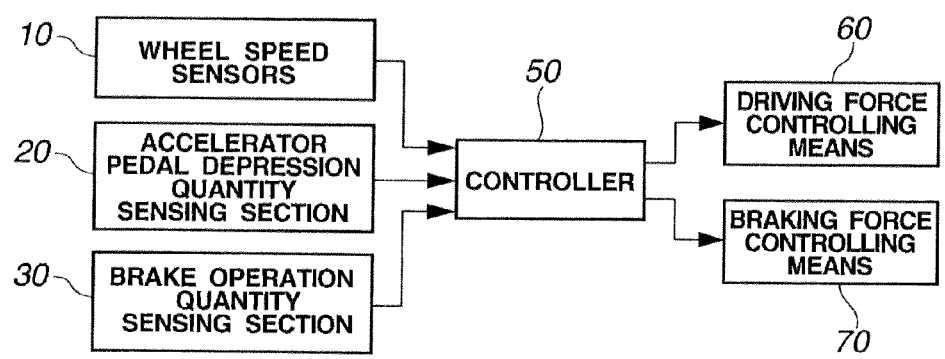
FIG. 1 is a system view showing the structure of a vibration-damping control apparatus according to a first embodiment.
Figure 2:
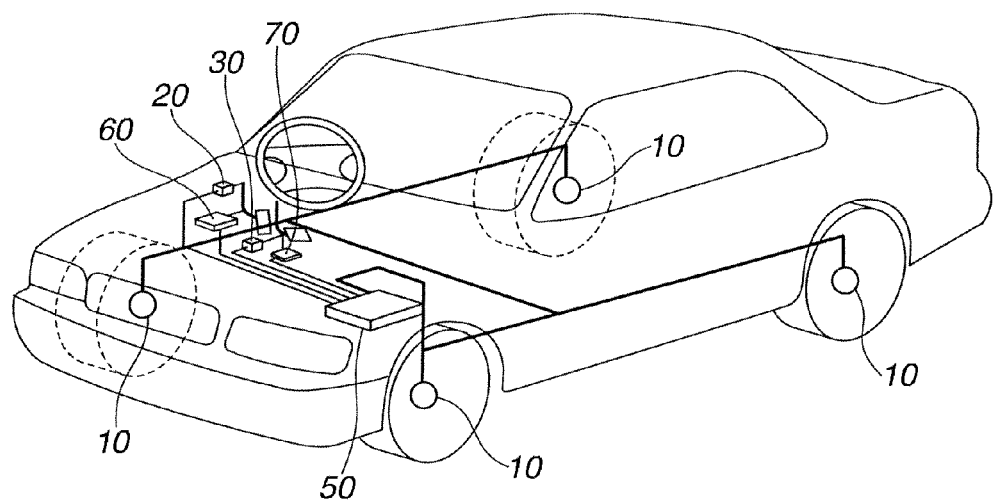
FIG. 2 is a structure view showing a vehicle equipped with the vibration-damping control apparatus according to the first embodiment.

FIG. 1 is a system view showing the structure of a vibration-damping or vibration-suppressing apparatus according to a first embodiment. FIG. 2 is a structure view showing a vehicle equipped with the vibration-damping apparatus. First, explanation is directed to the structure of the vibration-damping apparatus. Wheel speed sensors 10 sense the wheel speeds of the respective wheels of the vehicle from the rpms of the respective wheels. An accelerator pedal depression quantity sensing section 20 senses an accelerator opening degree APO representing the depression quantity of an accelerator pedal by the driver. A brake operation quantity sensing section 30 senses a brake operation quantity S_b by the driver (such as a brake pedal stroke quantity or a depressing force on a brake pedal).

A controller 50 delivers control signals to a driving force controlling means or device 60 and a braking force controlling means or device 70, which are actuators of the vibration-suppressing apparatus, in accordance with the state variables sensed by the sensors. In accordance with the accelerator opening degree APO, inputted from the accelerator pedal depression quantity sensing section 20, and the brake operation quantity S_b, inputted from the brake operation quantity sensing section 30, the controller 50 calculates a driving/braking (or longitudinal) torque requested by the driver (request driving/braking torque Te_a, Tw_b)_(a request driving/braking torque calculating means or device 51). Furthermore, in accordance with the wheel speeds of the wheels inputted from wheel speed sensors 10, the controller 50 calculates a disturbance acting on the tire of each wheel from a variation of the wheel speed (a longitudinal disturbance calculating means or device 52). Controller 50 estimates a behavior of a vehicle body sprung (or spring) part from the calculated request driving/braking torque and longitudinal disturbance (a sprung (or spring) behavior estimating means or device 53). Then, controller 50 calculates a correction torque to suppress a vibration of the estimated vehicle body sprung (or spring) part behavior (a correction torque calculating means or device 54), and adjusts an output in accordance with the calculated correction torque.

Controller 50 performs an output adjusting operation to the calculated correction torque, in accordance with a signal from a later-mentioned correction torque monitoring means or device 55 (output adjusting means or device 55). Moreover, controller 50 changes over an output mode of the correction torque treated by the output adjusting operation, in accordance with a signal from the correction torque monitoring device 55 (mode changeover means or device 56), and outputs a correction torque command. Controller 50 monitors the correction torque adjusted by the output adjusting operation by output adjusting device 55 to examine whether the correction torque is in a condition of hunting, and delivers the result of the monitoring to output adjusting device 55 and mode changeover device 56 (correction torque monitoring means or device 55). Controller 50 delivers a calculated correction torque command to driving force controlling means or device 60 and braking force controlling means or device 70.

Figure 3:
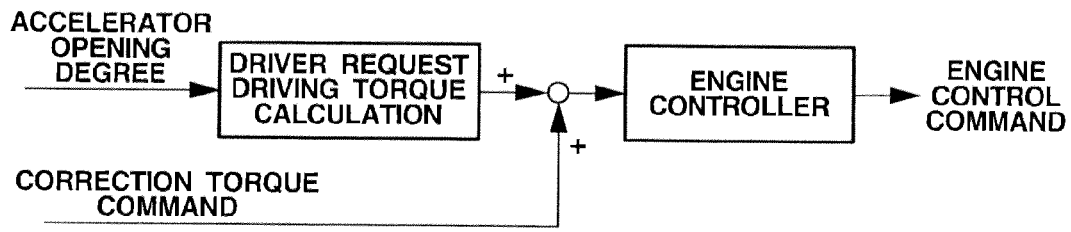
FIG. 3 is a block diagram showing the control structure of a driving force control device according to the first embodiment.
Figure 4:
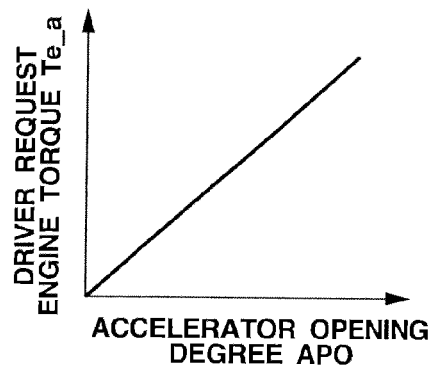
FIG. 4 is a view showing a map representing a driver request engine torque characteristic according to the first embodiment.

FIG. 3 is a block diagram showing the control structure of a driving force control device according to the first embodiment. A driving force control means or device 60 calculates a control command for the engine. The driving force control device calculates the driver request driving torque in accordance with accelerator opening degree APO, and calculates a target driving torque by adding the correction torque command outputted from controller 50 to the driver request driving torque. An engine controller calculates an engine control command in accordance with the target driving torque. FIG. 4 shows a map representing a characteristic of a driver request engine torque. The driver request driving torque is calculated by converting the driver request engine torque read out from the characteristic map defining the relationship between the accelerator opening degree APO and the driver request engine torque Te_a, as shown in FIG. 4, into the torque at the driving shaft end by using a differential gear ratio and a speed ratio of an automatic transmission.

Figure 5:
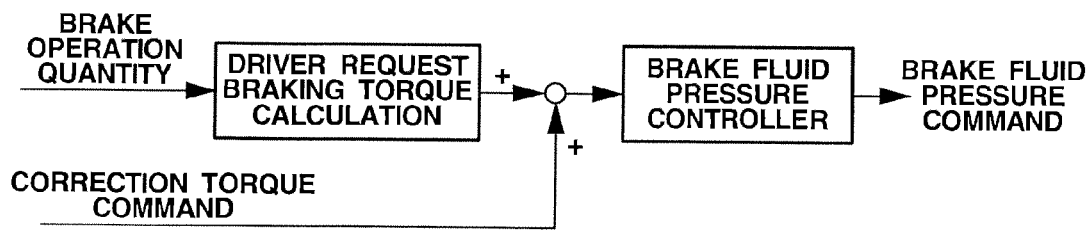
FIG. 5 is a block diagram showing the control structure of a braking force control device according to the first embodiment.
Figure 6:
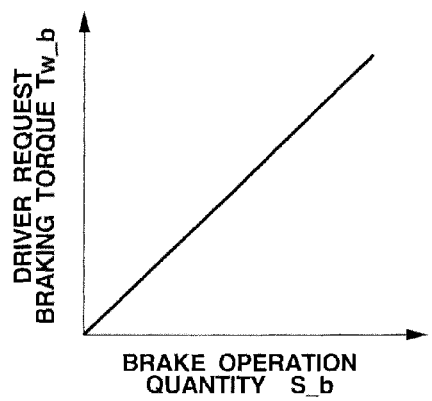
FIG. 6 is a view showing a map representing a driver request braking torque characteristic according to the first embodiment.

FIG. 5 is a block diagram showing the control structure of a braking force control device. A braking force control means or device 70 outputs a brake fluid pressure command. The braking force control device calculates the driver request braking torque Tw_b in accordance with the brake pedal operation quantity S_b, and calculates a target braking torque by adding the correction torque command, inputted separately, to the driver request braking torque Tw_b. A brake fluid pressure controller calculates a brake fluid command in accordance with the target braking torque. FIG. 6 shows a map representing a characteristic of the driver request braking torque. The driver request braking torque is calculated by reading out the driver request braking torque from the characteristic map defining the relationship between the brake operation quantity S_b and the driver request braking torque Tw_b as shown in FIG. 6.

Figure 7:
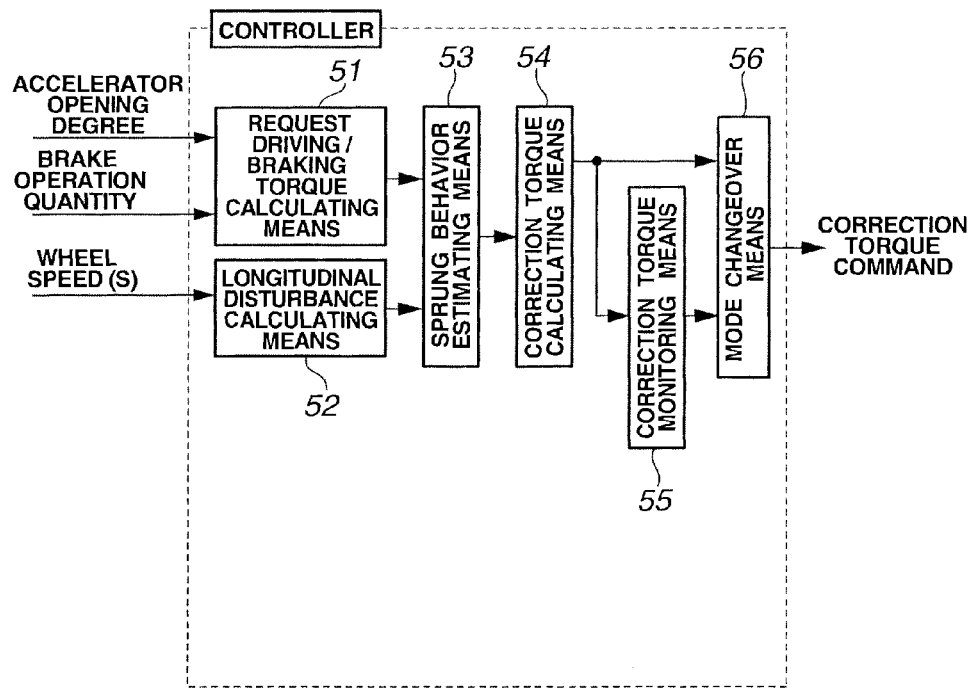
FIG. 7 is a block diagram showing operation performed in a controller in the vibration-damping control apparatus according to the first embodiment.

FIG. 7 is a block diagram showing operations performed by the controller in the vibration-suppressing control apparatus according to the first embodiment. A request driving/braking torque calculating means or device 51 receives signals from the accelerator pedal depression quantity sensing section 20 and the brake operation quantity sensing section 30, and calculates (or front and rear) the driving/braking torque requested by the driver. A longitudinal disturbance calculating means or device 52 calculates a longitudinal disturbance acting on the tire of each wheel in the longitudinal, or front and rear, direction, from the variation of the wheel speed of each wheel using the wheel speed inputs from wheel speed sensor 10. A sprung (or spring) behavior estimating means or device 53 estimates a behavior of the vehicle body sprung (or spring) part from the request driving/braking torque calculated by the request driving/braking torque calculating means or device 51 and the longitudinal disturbance calculated by the longitudinal disturbance calculating means 52.

A correction torque calculating means or device 54 then calculates the correction torque needed to suppress vibrations of the vehicle body sprung part estimated by sprung behavior estimating means 53. A correction torque monitoring means 55 examines whether the correction torque signal is in a hunting state or not by monitoring the correction torque calculated by the correction torque calculating means 54, and then sets an output mode. A mode changeover or selecting means or device 56 determines the correction torque command according to the output mode set by correction torque monitoring means 55.

The correction torque monitoring means 55 and the mode changeover means 56 form a characteristic part (corresponding to a correction torque command output means or section) of the present invention, and which are arranged to correct the driving/braking torque toque so as to suppress the vehicle body sprung vibration due to the request driving/braking torque and longitudinal disturbance. That is, when a hunting state of the torque correction quantity (or the correction torque) is detected, the vibration-damping control system stops the output of the correction torque and restrains uncomfortable vibrations from being transmitted to the driver. When the hunting is settled, the vibration-damping control system restores the output of the correction torque. By so doing, the vibration-damping control system prevents hunting from being repeated, restarts the output of the correction torque promptly, and increases the performing frequency of the vibration-damping control.

FIGS. 8-17 show operations of the vibration-damping control system according to the first embodiment. FIG. 8 is a flowchart showing the sequence of steps in a vibration-damping control process in the controller according to the first embodiment. This control process is performed repetitively at regular time intervals of a predetermined length, for example, 10 msec.

At a step S100, the controller reads the traveling or running state. The traveling state is information on the operating condition of the driver and running conditions of the host vehicle, which is the vehicle equipped with this control system. In this example, the controller reads the wheel speeds of the wheels sensed by wheel speed sensors 10, the accelerator opening degree APO sensed by accelerator pedal depression quantity sensing section 20, and the brake operation quantity S_b sensed by brake operation quantity sensing section 30.

At a step S200, the controller calculates the driver request driving/braking torque Tw in accordance with the driver operating conditions read at S100 in the following manner.

The driver request engine torque Te_a is determined from the accelerator opening degree APO by a readout from the characteristic map defining the relationship between the accelerator opening degree and the driver request engine torque as shown in FIG. 4.

$$Te\_a = map(APO)$$

The driver request driving torque Tw_a is calculated by converting the thus-determined driver request engine torque Te_a into the driving shaft torque by using the differential gear ratio Kdif and the gear ratio Kat of the automatic transmission.

$$Tw\_a = (1/(Kdf \cdot Kat)) \cdot Te\_a$$

Similarly, the driver request braking torque Tw_b is determined from the operation quantity S_b of the brake pedal according to the characteristic map defining the relationship between the brake operation quantity and the driver request braking torque as shown in FIG. 6.

The request driving/braking torque Tw is calculated from the calculated driver request driving torque Tw_a and the driver request braking torque Tw_b according to the following equation.

$$Tw = Tw\_a - Tw\_b$$

At a step S300, the controller calculates the longitudinal disturbance to be inputted to a later-mentioned motion model in accordance with the wheel speeds of the wheels read at S100. The longitudinal disturbance in the longitudinal direction, or front and rear direction, is a force inputted to each wheel from the road surface. The longitudinal disturbance can be calculated in the following manner.

A wheel speed of each wheel with respect to the vehicle body is calculated by removing an actual vehicle speed component Vbody from each of the sensed wheel speeds $Vw_{FR}$, $Vw_{FL}$, $Vw_{RR}$ and $Vw_{RL}$. A wheel acceleration of each wheel is calculated by time differentiation, which is determined by a difference between a current value and a previous value of the wheel speed. Each of the front and rear longitudinal disturbances $\Delta Ff$ and $\Delta Fr$ of the front and rear wheels is calculated by multiplying the calculated wheel acceleration of each wheel by an unsprung mass.

At a next step S400, the controller estimates the sprung behavior from the request driving/braking torque Tw calculated at S200 and the longitudinal disturbances $\Delta Ff$ and $\Delta Fr$ calculated at S300.

First, explanation is directed to the motion model in the first embodiment. FIG. 9 is a schematic view showing a vehicle motion model according to the first embodiment. This vehicle motion model is a front and rear two-wheel model having front and rear suspensions with respect to the vehicle body. The vehicle motion model has, as parameters, a driving/braking torque variation $\Delta Tw$ produced in the vehicle, the longitudinal disturbance $\Delta Ff$ produced in the front wheel in dependence on road surface condition variation, driving/braking force variation and steering operation, and the longitudinal disturbance $\Delta Fr$ produced in the rear wheel. This model is composed of suspension models having a spring-damper system, corresponding to the front wheel and the rear wheel, and a vehicle body sprung model representing the quantity of movement, or displacement, of the center of gravity of the vehicle body.

Next, using the vehicle model, a situation is illustrated where a driving/braking torque variation is produced in the vehicle and a longitudinal disturbance is produced by the addition of at least one road surface condition variation, driving/braking force variation, and steering operation to a tire.

When at least one of the driving/braking torque variation $\Delta Tw$ and the longitudinal disturbances $\Delta Ff$ and $\Delta Fr$ is produced in the vehicle body, the vehicle body is rotated by an angle $\theta p$ about the pitching axis and, at the same time, the center of gravity is moved through an up and down displacement xb. The driving/braking torque variation $\Delta Tw$ is calculated from a difference between the driving/braking torque $\Delta Twn$, which is calculated from the driver's accelerator operation and brake operation, and a previous value $\Delta Twn-1$ of the driving/braking torque.

The following signs or symbols are used: a spring constant Ksf and a damping constant Csf of the front wheel's side suspension; a spring constant Ksr and a damping constant Csr of the rear wheel's side suspension; a link length Lsf and a link center height hbf of the front wheel's side suspension; a link length Lsr and a link center height hbr of the rear wheel's side suspension; a pitching inertia moment Ip of the vehicle body; a distance Lf between the front wheel and the pitching axis; a distance Lr between the rear wheel and the pitching axis; a height hcg of the center of gravity; and a sprung mass M. In this specification, for convenience of notation, in the case of the vector notation of each parameter, the time derivative d(parameter)/dt is expressed by a dot over the parameter in some cases. These two different notations are synonymous.

In this case, a motion equation, or equation of motion, of the up-down vibration of the vehicle body is expressed as:

$$M \cdot (d^2xb/dt^2) =$$
$$-Ksf(xb + Lf \cdot \theta p) - Csf(dxb/dt + Lf \cdot d\theta p/dt) - Ksr(xb - Lr \cdot \theta p) -$$
$$Csf(dxb/dt - Lr \cdot d\theta p/dt) - (hbf/Lsf)\Delta Ff + (hbr/Lsr)\Delta Fr$$

Moreover, a motion equation, or equation of motion, of the pitching vibration of the vehicle body is expressed as:

$$Ip \cdot (d^2\theta p/dt^2) = -Lf \cdot Ksf(xb + Lf \cdot \theta p) - Lf \cdot Csf(dxb/dt + Lf \cdot d\theta p/dt) +$$
$$Lr \cdot Ksr(xb - Lr \cdot \theta p) + Lr \cdot Csf(dxb/dt - Lr \cdot d\theta p/dt) -$$
$$\{hcg - (Lf - Lsf)hbf/Lsf\}\Delta Ff + \{hcg - (Lr - Lsr)hbr/Lsr\}\Delta Fr$$

By converting these two motion equations into a state equation by setting x1=xb, x2=dxb/dt, x3=θp and x4=dθp/dt, the following expression is obtained:

$$dx/dt = Ax + Bu$$

In this equation, each element is expressed as follows:

$$A = \begin{bmatrix} 0 & 1 & 0 & 0 \\ ab1 & ab2 & ab3 & ab4 \\ 0 & 0 & 1 & 0 \\ bb1 & bb2 & bb3 & bb4 \end{bmatrix},$$ [Math 1]

$$B = \begin{bmatrix} 0 & 0 & 0 \\ p1 & p2 & 0 \\ 0 & 0 & 0 \\ p3 & p4 & q \end{bmatrix}, x = \begin{bmatrix} xb \\ \dot{xb} \\ \theta p \\ \dot{\theta p} \end{bmatrix}, u = \begin{bmatrix} \Delta Ff \\ \Delta Fr \\ \Delta Tw \end{bmatrix}$$

$ab1 = -(Ksf + Ksr)/M$ $ab2 = -(Csf + Csr)/M$ $ab3 = -(Lf \cdot Ksf - Lr \cdot Ksr)/M$ $ab4 = -(Lf \cdot Csf - Lr \cdot Csr)/M$ $bb1 = -(Lf \cdot Ksf - Lr \cdot Ksr)/Ip$ $bb1 = -(Lf \cdot Csf - Lr \cdot Csr)/Ip$ $bb3 = -(Lf^2 \cdot Ksf - Lr^2 \cdot Ksr)/Ip$ $bb4 = -(Lf^2 \cdot Csf - Lr^2 \cdot Csr)/Ip$ $p1 = -hbf/M/Lsf$ $p2 = hbr/M/Lsr$ $p3 = hcg/Ip - (Lf - Lsf)hbf/Lsf/Ip$ $p4 = hcg/Ip - (Lr - Lsr)hbr/Lsr/Ip$ $q = 1/Ip$ Furthermore, the above-mentioned state equation is divided into a feed-forward term (F/F term), which receives, as an input the driving/braking torque, and a feed-back term (F/B term), which receives, as an input the front wheel and rear wheel running disturbances, by the input signal.

The feed-forward term is expressed as:

$$\dot{x} = Ax + B_{FF} \cdot \Delta Tw, B_{FF} = \begin{bmatrix} 0 \\ 0 \\ 0 \\ q \end{bmatrix}$$ [Math 2]

The feed-back term is expressed as:

$$\dot{x} = Ax + B_{FB} \cdot \begin{bmatrix} \Delta Ff \\ \Delta Fr \end{bmatrix}, B_{FB} = \begin{bmatrix} 0 & 0 \\ p1 & p2 \\ 0 & 0 \\ p3 & p4 \end{bmatrix}$$ [Math 3]

By determining x, it is possible to estimate the behavior of the vehicle body sprung part by the driving/braking torque variation ΔTw and the longitudinal disturbances ΔFf and ΔFr.

Referring back to FIG. 8, at a step S500, the controller calculates a correction torque dTw* to suppress vehicle body vibration in accordance with the sprung behavior estimated at S400. The following operations are performed in step S500.

The controller calculates the correction torque dTw* to be fed back to the request driving/braking torque from the respective sprung behaviors x with respect to the variation component ΔTw of the request driving/braking torque Tw calculated at S200 and the front and rear wheel longitudinal disturbances ΔFf and ΔFr. In this case, the feedback gain is determined so as to reduce vibrations of dxb/dt and dθp/dt. When, for example, the feedback gain is calculated to decrease dxb/dt in the feed-back term, a weighting matrix is set as:

$$Q_{xb\_FB} = \begin{bmatrix} 1 & 0 & 0 & 0 \\ 0 & 3e10 & 0 & 0 \\ 0 & 0 & 1 & 0 \\ 0 & 0 & 0 & 1 \end{bmatrix}, R_{xb\_FB} = \begin{bmatrix} 1 & 0 \\ 0 & 1e15 \end{bmatrix}$$ [Math 4]

And a control input is an input to minimize J in the following equation.

$$J = \int_0^\infty (x^T(t)Q_{xb\_FB}x(t) + u^T(t)R_{xb\_FB}u(t))dt$$ [Math 5]

The solution is given by mathematical expression 7, on the basis of a positive symmetric solution p of a Riccati algebraic equation and expressed as:

$$A^Tp + pA - pBR_{xb\_FB}^{-1}B^Tp + Q_{xb\_FB} = 0$$ [Math 6]

$$u(t) = -F_{xb\_FB}x(t), F_{xb\_FB} = R_{xb\_FB}B^Tp$$ [Math 7]

In this expression, $F_{xb\_FB}$ is a feedback gain matrix with respect to dxb/dt in the feed-back term.

It is possible to calculate a feedback gain $F_{\theta hp\_FB}$ to reduce vibration of dθp/dt in the feed-back term, and feedback gains Fxb_FF and Fθhp_FF in the feed-forward term to reduce dxb/dt and dθp/dt, respectively, in the same manner.

In the case of the feedback gain $F_{\theta hp\_FB}$ to reduce the vibration of dθp/dt in the feed-back term, a weighting matrix is set as:

$$Q_{xb\_FB} = \begin{bmatrix} 1 & 0 & 0 & 0 \\ 0 & 1 & 0 & 0 \\ 0 & 0 & 1 & 0 \\ 0 & 0 & 0 & 5e10 \end{bmatrix}, R_{thp\_FB} = \begin{bmatrix} 1 & 0 \\ 0 & 1e15 \end{bmatrix} \quad \text{[Math 8]}$$

The feedback gain $F_{thp\_FB}$ to reduce the vibration of $d\theta p/dt$ in the feed-back term is calculated by, $$F_{thp\_FB} = R_{thp\_FB} B^T p \quad \text{[Math 9]}$$

Similarly, in the case of the feedback gain $F_{xb\_FF}$ to reduce dxb/dt in the feed-forward term, a weighting matrix is set as:

$$Q_{xb\_FF} = \begin{bmatrix} 1 & 0 & 0 & 0 \\ 0 & 1e9 & 0 & 0 \\ 0 & 0 & 1 & 0 \\ 0 & 0 & 0 & 1 \end{bmatrix}, R_{xb\_FF} = [1] \quad \text{[Math 10]}$$

The feedback gain $F_{xb\_FF}$ to reduce dxb/dt in the feed-forward term is calculated by, $$F_{xb\_FF} = R_{xb\_FF} B^T p \quad \text{[Math 11]}$$

In the case of the feedback gain $F_{xb\_FF}$ to reduce dxb/dt, $d\theta p/dt$ in the feed-forward term, a weighting matrix is set as:

$$Q_{thp\_FF} = \begin{bmatrix} 1 & 0 & 0 & 0 \\ 0 & 1 & 0 & 0 \\ 0 & 0 & 1 & 0 \\ 0 & 0 & 0 & 1e9 \end{bmatrix}, R_{thp\_FF} = [1] \quad \text{[Math 12]}$$

The feedback gain to reduce $d\theta p/dt$ in the feed-forward term is calculated by, $$F_{thp\_FF} = R_{thp\_FF} B^T p \quad \text{[Math 13]}$$

This is a method of optimal regulation. However, it is optional to employ a design by another method, such as pole assignment.

The correction torque dTw* is calculated by weighting and adding the correction torques determined by the above-mentioned four equations.

At step S600, the controller sets the output mode in accordance with the correction torque dTw* calculated at S500. This process is illustrated in FIGS. 10-15.

[Correction Torque Monitoring Process]

Figure 10:
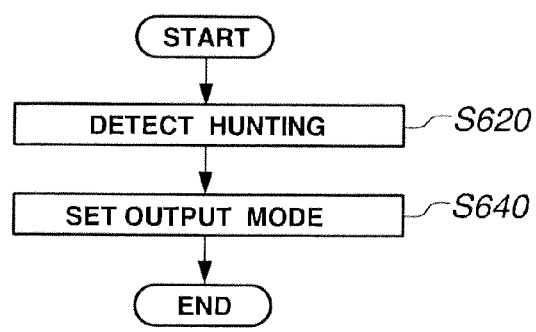
FIG. 10 is a flowchart showing an output mode setting process in the first embodiment.

FIG. 10 is a flowchart showing a process of setting the output mode in the first embodiment.

At a step S620, the controller detects hunching of the correction torque dTw*. The process of S620 is illustrated in FIGS. 11~15.

Figure 11:
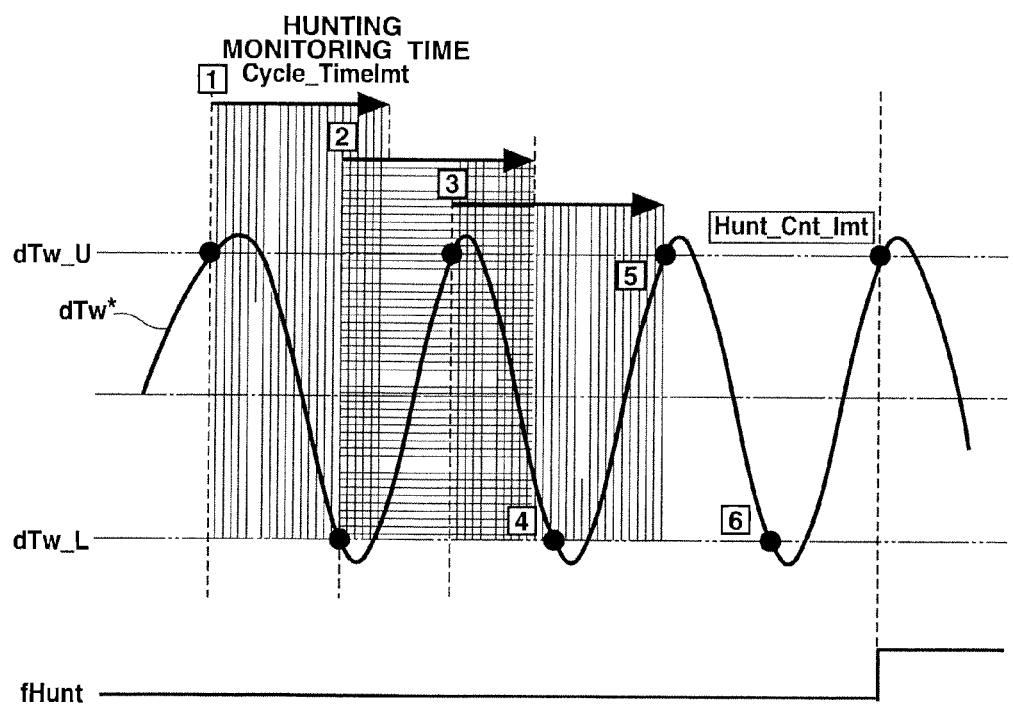
FIG. 11 is a conceptual diagram illustrating a hunting detecting method in the first embodiment.
Figure 12:
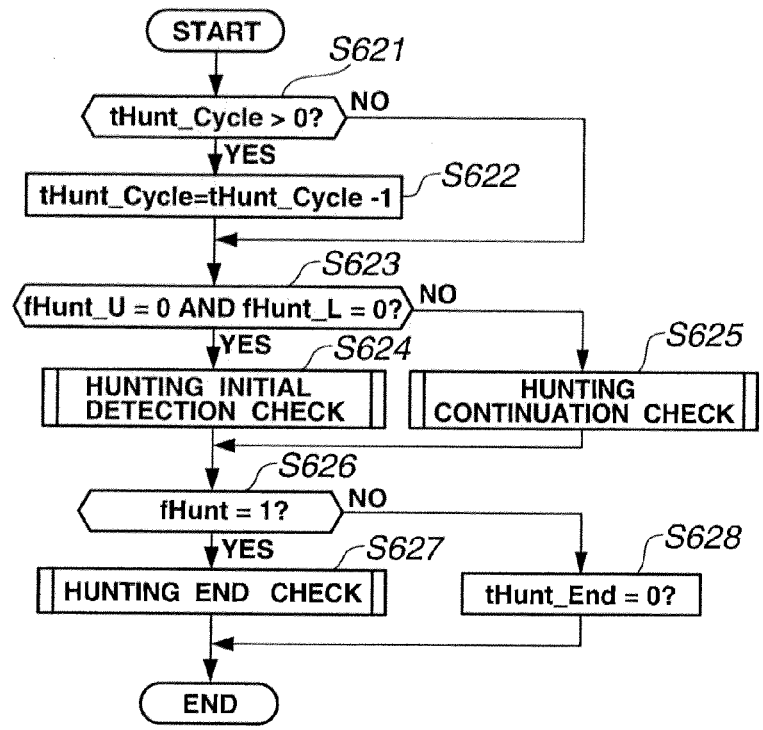
FIG. 12 is a flowchart showing a hunting detecting process according to the first embodiment.

FIG. 11 is a conceptual diagram illustrating a hunting detecting method in the first embodiment. The controller counts the number of times of overshoot of the after-adjustment correction torque dTw* beyond a predetermined correction torque upper limit threshold dTw_U (or a predetermined correction torque lower limit threshold dTw_L). When the counted number of times becomes equal to a hunting judgment number Hunt_Cnt_lmt, then the controller judges that the hunting state is present and sets a hunting flag fHunt to one. In the example illustrated in FIG. 11, the hunting judgment number Hunt_Cnt_lmt is set equal to 7. The count is performed when the correction torque dTw* exceeds the correction torque threshold dTw_L (or dTw_U) within a hunting monitoring time period Cycle_Timelmt from an overshoot of the correction torque dTw* beyond the correction torque threshold dTw_U (or dTw_L). When the correction torque dTw* does not exceed the correction torque threshold within the hunting monitoring time period Cycle_Timelmt, then the controller judges that the hunting state is not present, and clears the counter.

[Hunting Detecting Process]

FIGS. 12-15 are views used for detailed explanation of the hunting detecting process. FIGS. 12-15 are flowcharts showing the hunting detecting process according to the first embodiment.

Figure 13:
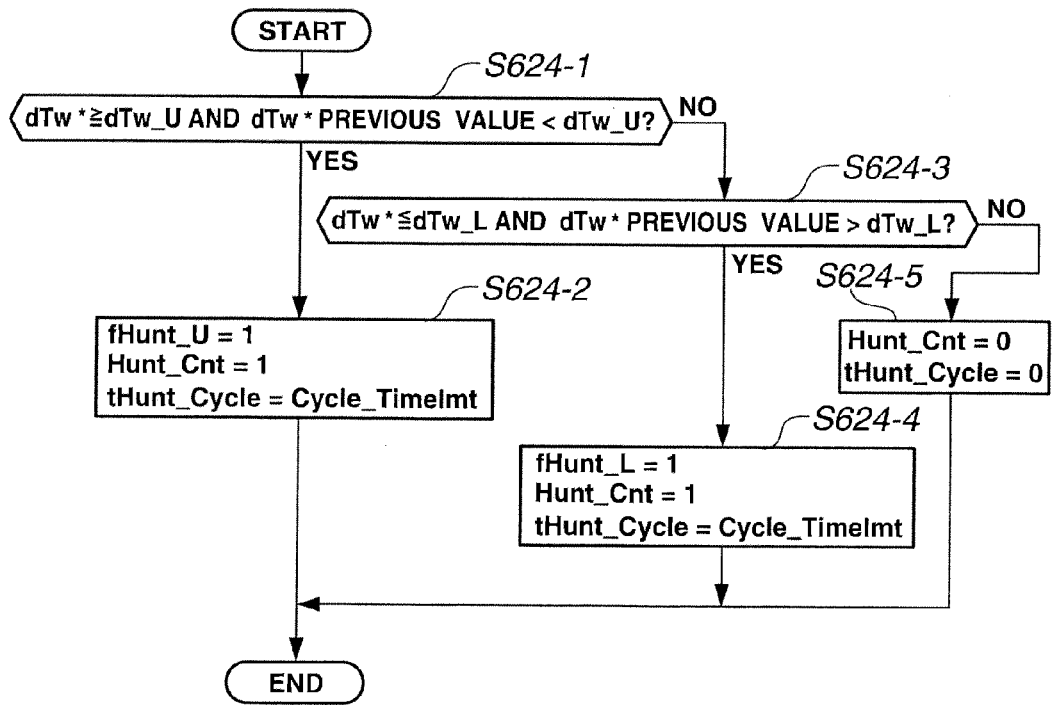
FIG. 13 is a flowchart showing the hunting detecting process according to the first embodiment.

At a step S621, the controller examines whether a hunting monitoring timer tHunt_Cycle is positive or not. In the case of YES, the controller decreases the hunting monitoring timer tHunt_Cycle by one at a step S622. In the case of NO at S621, the controller proceeds from S621 directly to a step S623. At step S623, the controller examines whether an upper limit threshold reaching flag fHunt_U is equal to zero and a lower limit threshold reaching flag fHunt_L is equal to zero, or not. In the case of YES, the controller performs a hunting initial detection check at a step S624. FIG. 13 is a flowchart showing the hunting initial detection check performed at S624.

(Hunting Initial Detection Check)

At a step S624-1, the controller examines whether the correction torque dTw* is equal to or greater than the correction torque upper limit threshold dTw_U, and a previous value of the correction torque dTw* is smaller than the correction torque upper limit threshold dTw_U. In the case of YES, the controller proceeds from S624-1 to a step S624-2. At step S624-2, the controller sets the upper limit threshold reaching flag fHunt_U to one, sets the hunting count Hunt_Cnt to one, and sets the hunting monitoring timer tHunt_Cycle equal to the hunting monitoring time period Cycle_Timelmt. Thereafter, the controller terminates the process of FIG. 13.

In the case of NO at step S624-1, the controller proceeds from S624-1 to a step S624-3 and examines whether the correction torque dTw* is equal to or smaller than the correction torque lower limit threshold dTw_L, and a previous value of the correction torque dTw* is greater than the correction torque lower limit threshold dTw_L. In the case of YES, the controller proceeds from S624-3 to a step S624-4. At step S624-4, the controller sets the lower limit threshold reaching flag fHunt_L to one, sets the hunting count Hunt_Cnt to one, and sets the hunting monitoring timer tHunt_Cycle equal to the hunting monitoring time period Cycle_Timelmt. Thereafter, the controller terminates the process of FIG. 13.

In the case of NO at step S624-3, the controller proceeds to a step S624-5, the controller clears the hunting count Hunt_Cnt and the hunting monitoring timer tHunt_Cycle, and thereafter terminates the process of FIG. 13.

Figure 14:
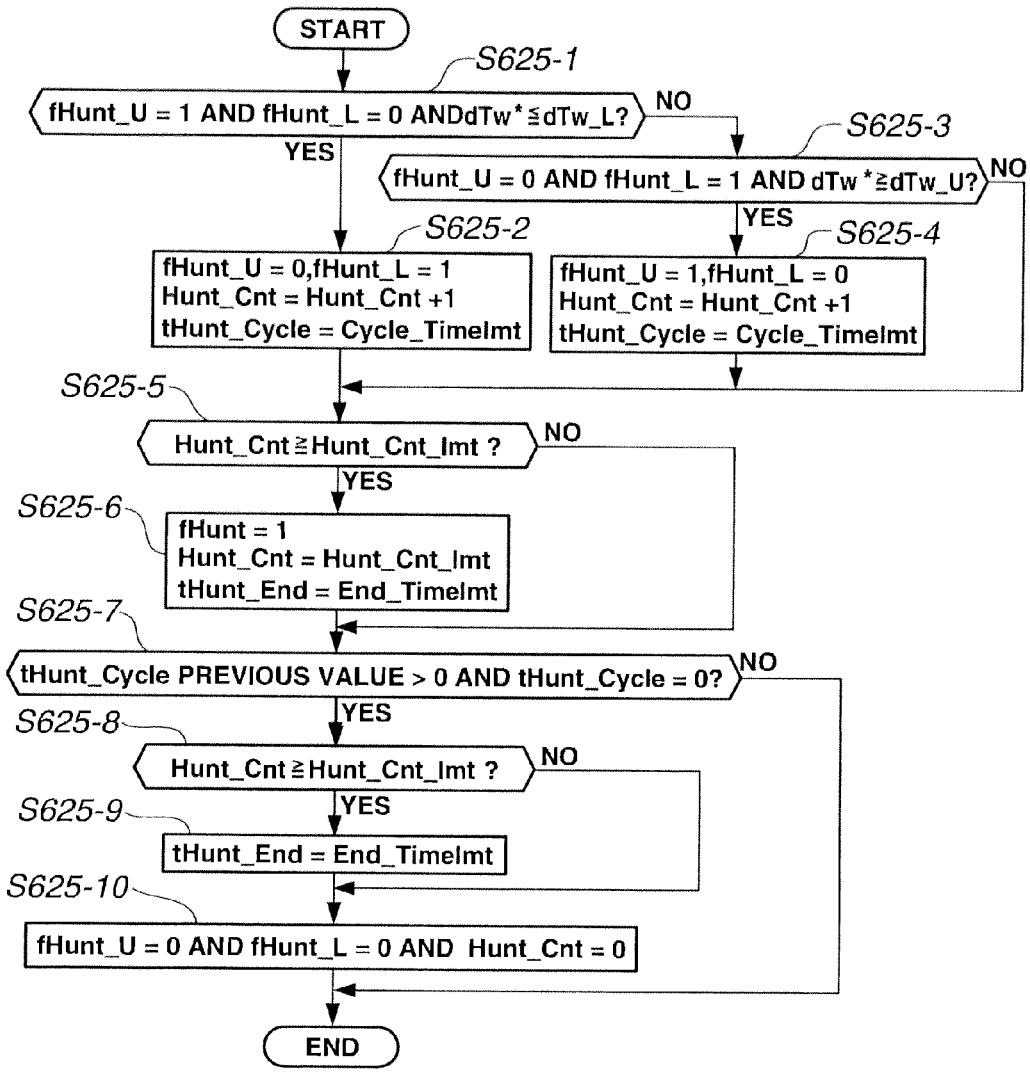
FIG. 14 is a flowchart showing the hunting detecting process according to the first embodiment.

In the case of NO at step S623, the controller performs a hunting continuation check at a step S625. FIG. 14 is a flowchart showing this process of step S625.

(Hunting Continuation Check Process)

FIG. 14 is a flowchart showing the hunting continuation check process according to the first embodiment.

At a step S625-1, the controller examines whether the upper limit threshold reaching flag fHunt_U is equal to one, the lower limit threshold reaching flag fHunt_L is equal to zero, and the correction torque dTw* is equal to or lower than the correction torque lower limit threshold dTw_L. In the case of YES, at a step S625-2, the controller resets the upper limit threshold reaching flag fHunt_U to zero, sets the lower limit threshold reaching flag fHunt_L to one, sets the hunting monitoring timer tHunt_Cycle to the hunting monitoring time period Cycle_Timelmt, and adds one to the hunting count Hunt_Cnt. Thereafter, the controller proceeds to a step S625-5.

In the case of NO at step S625-1, the controller proceeds from S625-1 to a step S625-3, and the controller examines whether the upper limit threshold reaching flag fHunt_U is equal to zero, the lower limit threshold reaching flag fHunt_L is equal to one, and the correction torque dTw* is equal to or greater than the correction torque upper limit threshold dTw_U. In the case of YES, the controller proceeds to a step S625-4. At S625-4, the controller sets the upper limit threshold reaching flag fHunt_U to one, resets the lower limit threshold reaching flag fHunt_L to zero, sets the hunting monitoring timer tHunt_Cycle to the hunting monitoring time period Cycle_Timelmt, and adds one to the hunting count Hunt_Cnt. Thereafter, the controller proceeds to step S625-5. In the case of NO at step S625-3, the controller proceeds from S625-3 directly to step S625-5.

At step S625-5, the controller examines whether the hunting count Hunt_Cnt is equal to or greater than the hunting judgment number Hunt_Cnt_lmt. In the case of YES, the controller proceeds to a step S625-6. At step S625-6, the controller sets the hunting flag fHunt to one on the assumption that the hunting state is present, sets the hunting count Hunt_Cnt equal to the hunting judgment number Hunt_Cnt_lmt, and sets a discontinuation return timer tHunt_End equal to a return time period End_Timelmt (corresponding to a first time period T1). In the case of NO at step S625-5, the controller proceeds directly from S625-5 to a step S625-7.

At step S625-7, the controller examines whether the previous value of the hunting monitoring timer tHunt_Cycle is positive and the hunting monitoring timer tHunt_Cycle is equal to zero. In the case of NO, the controller terminates the process of FIG. 14 directly. In the case of YES, the controller proceeds from S625-7 to a step S625-8, and the controller examines whether the hunting count Hunt_Cnt is equal to or greater than the hunting judgment number Hunt_Cnt_lmt. In the case of YES, at a step S625-9, the controller sets the discontinuation return timer tHunt_End equal to a return time period End_Timelmt (corresponding to a first time period T1). In the case of NO at S625-8, the controller proceeds from S625-8 directly to a step S625-10. At step S625-10, the controller clears the upper limit threshold reaching flag fHunt_U, the lower limit threshold reaching flag fHunt_L and the hunting count Hunt_Cnt, and thereafter terminates the process of FIG. 14.

Figure 15:
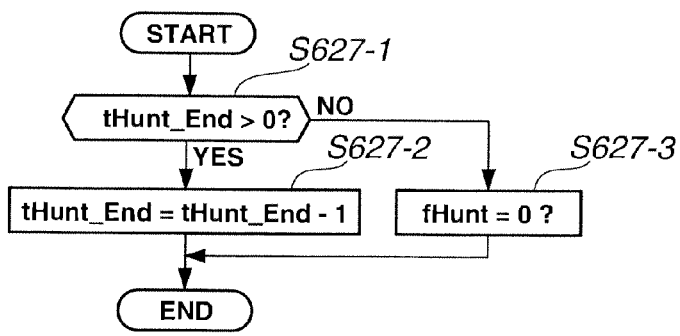
FIG. 15 is a flowchart showing the hunting detecting process according to the first embodiment.

Referring back to FIG. 12, at a step S626, the controller examines whether the hunting flag fHunt is equal to one or not. In the case of YES, the controller proceeds to a step S627 and performs a hunting end check. In the case of NO, the controller clears the discontinuation return timer tHunt_End at a step S628, and then terminates the process of FIG. 12. FIG. 15 shows the hunting end check process performed at step S627 in the form of a flowchart.

(Hunting End Check Process)

FIG. 15 is a flowchart showing the hunting end check process according to the first embodiment.

At a step S627-1, the controller examines whether the discontinuation return timer tHunt_End is positive or not. In the case of YES, the controller proceeds to a step S627-2. At step S627-2, the controller decreases the discontinuation return timer tHunt_End by one, and terminates the process of FIG. 15. In the case of NO, the controller judges that the hunting state ends, and clears the hunting flag fHunt at a step S627-3, and then terminates the process of FIG. 15.

(Output Mode Setting Process)

Figure 16:
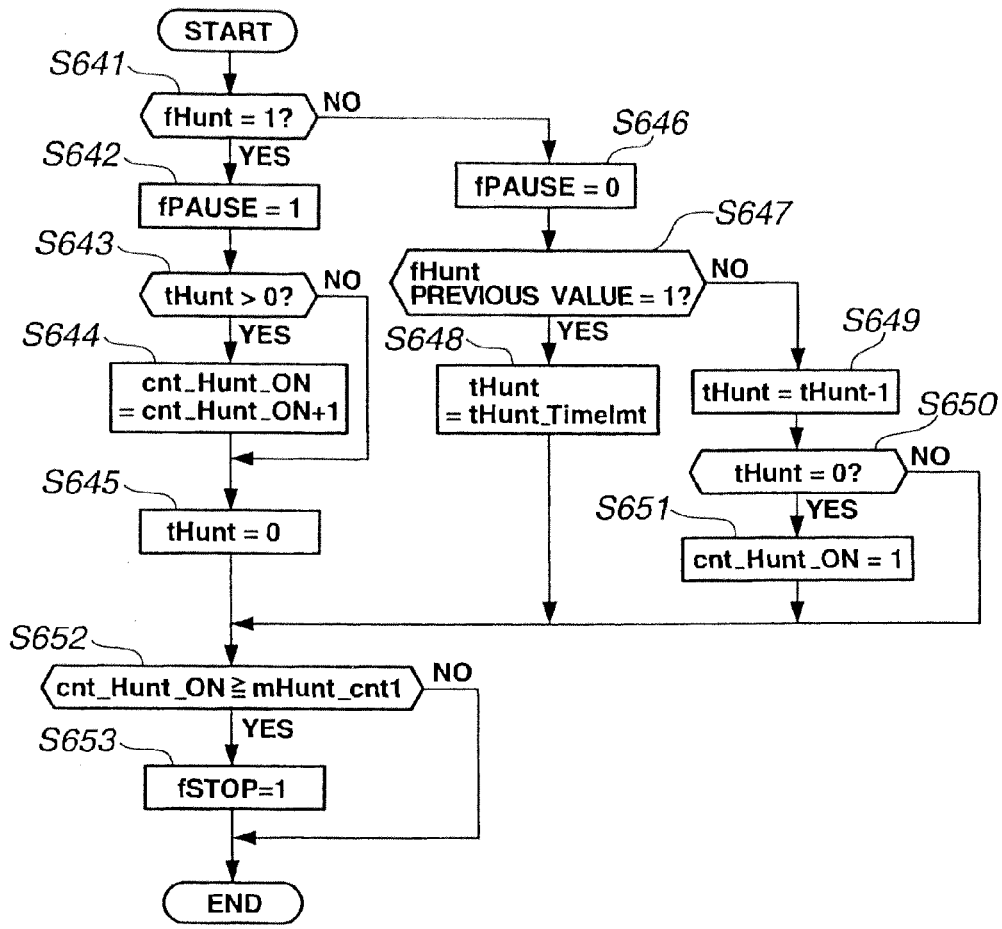
FIG. 16 is a flowchart showing the output mode setting process according to the first embodiment.

At step S640 of FIG. 10, the controller sets the output mode in accordance with the hunting result detected at step S620. The process performed at step S640 is illustrated by FIG. 16. FIG. 16 is a flowchart showing the output mode setting process according to the first embodiment.

At a step S641, the controller examines whether the hunting flag fHunt is one or not. In the case of YES, the controller proceeds to a step S642, and sets a control pause flag or control discontinuation flag fPAUSE to one on the assumption that the hunting state is present. At a step S643, the controller examines whether a hunting end elapsed time tHunt is positive or not. In the case of YES, the controller proceeds to a step S644, and adds one to a hunting continuation count cnt_Hunt_On. In the case of NO, the controller proceeds directly to a step S645. At step S645, the controller clears the hunting end elapsed time tHunt. Then, the controller proceeds to a step S652.

In the case of NO at S641, the controller proceeds to a step S646 and resets the control pause flag fPAUSE to zero on the assumption that the hunting state ends. At a step S647, the controller examines whether the previous value of the hunting flag fHunt is equal to one or not. In the case of YES, the controller proceeds to a step S648, and sets the hunting end elapsed time tHunt equal to a predetermined time Hunt_Timelmt (corresponding to a second predetermined time length T2).

In the case of NO at S647, the controller proceeds to a step S649, and subtracts one from the hunting end elapsed time tHunt. At a step S650, the controller examines whether the hunting end elapsed time tHunt is equal to zero or not. In the case of YES, the controller clears the hunting continuation count cnt_Hunt_ON at a step S651. In the case of NO, the controller proceeds to step S652 directly.

At step S652, the controller examines whether the hunting continuation count cnt_Hunt_ON is greater than a predetermined continuation count mHunt_cnt. In the case of NO, the controller terminates the process of FIG. 16 directly. In the case of YES, the controller sets the control stop flag fSTOP to one at a step S653 because the hunting has been generated the predetermined number of times mHunt_cnt during the predetermined time period Hunt_Timelmt from the end of the hunting. When the control stop flag fSTOP is set at one, the output is not resumed even if the hunting state ends.

[Mode Changeover Process]

Referring back to FIG. 8, at a step S700, the controller calculates the correction torque command dTw_out* according to the output mode set at step S600. The process is explained with reference to a flowchart shown in FIG. 17.

Figure 17:
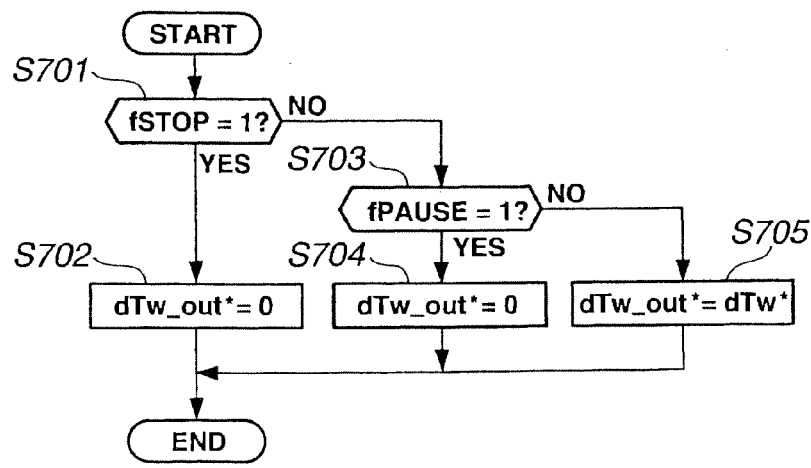
FIG. 17 is a flowchart showing a mode changeover process according to the first embodiment.

FIG. 17 shows the mode changeover process according to the first embodiment in the form of a flowchart.

At a step S701, the controller examines whether the control stop flag fSTOP is equal to one or not. In the case of YES, the controller proceeds to a step S702, sets the correction torque command dTw_out* equal to zero, and terminates the process. In the case of NO, the controller proceeds to a step S703.

At step S703, the controller examines whether the control pause flag fPAUSE is one or not. In the case of YES, the controller sets the correction torque command dTw_out* equal to zero and terminates the process. The value of zero to which the correction torque command dTw_out* is set at step S704 corresponds to a hunting time correction torque command. In the case of NO, the controller sets the correction torque command dTw_out* equal to the correction torque dTw1*.

[Command Output Process]

Referring back to FIG. 8, at a step S800, the controller outputs the correction torque command dTw_out* calculated at step S700 to the driving force control means 60 and the braking force control means 70. Thereafter, the controller terminates the current cycle of the process.

[Operation by the Vibration Damping Control Process]

(When the Hunting State is Generated Again Before Expiration of the Return Time Period after the End of the Last Hunting State)

Figure 18:
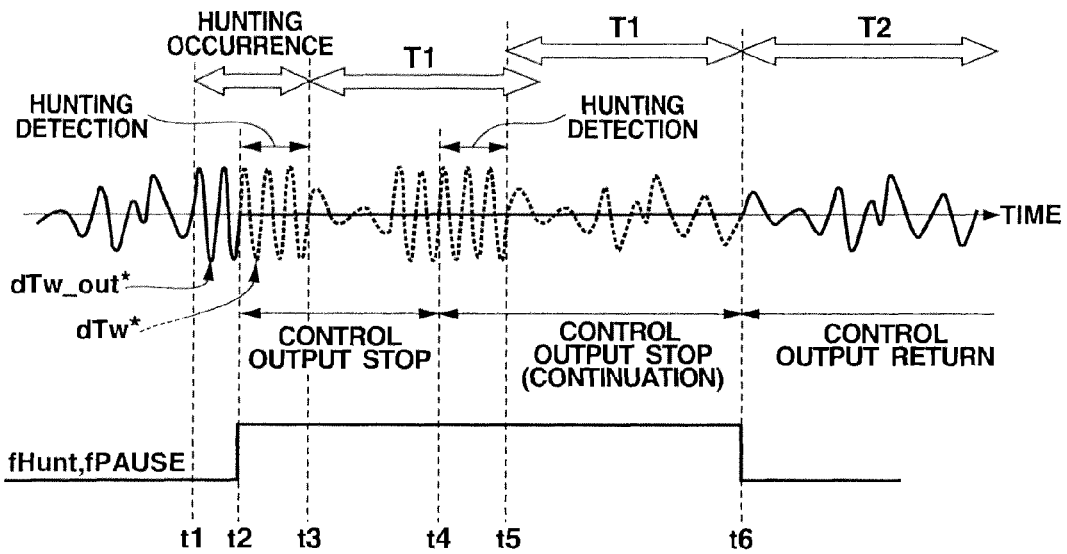
FIG. 18 is a time chart for illustrating operations when the vibration-damping control process according to the first embodiment is performed.

FIG. 18 illustrates, in the form of a time chart, operations of the vibration-damping control process according to the first embodiment. In the example of FIG. 18, a hunting state is generated in the correction torque command in the vibration-damping control in order to suppress vibrations produced in the vehicle during travel on a rough road.

At an instant t1, the correction torque command based on the vibration-damping control increases the amplitude and thereby starts hunting oscillation by the influence of the rough road.

At an instant t2, the continuation of the hunting state amounts to a predetermined time length or period and the control system sets the hunting flag fHunt and the control pause flag fPAUSE (at steps S625-6 and S642). Since the control pause flag fPAUSE is set, the control system outputs the correction torque command dTw_out*, which equals 0, to the actuator (step S703→S704) even if the correction torque dTw* continues hunting. This correction torque command dTw_out* corresponds to "correction torque command" recited in the claims.

At an instant t3, when it is judged that the hunting of correction torque dTw* has subsided, the control system sets the discontinuation return timer tHunt_End equal to the return time period End_Timelmt (corresponding to a first predetermined time period T1) (at step S625-9), and checks the continuation of the state in which the hunting is settled for the return time period End_Timelmt.

If, at an instant t4, the hunting state is generated again before the expiration of the return time period End_Timelmt from instant t3, the hunting detection is performed. If the hunting state ends at an instant t5 before the expiration of the return time period End_Timelmt from instant t4, then the control system sets the return time period End_Timelmt at instant t5.

At an instant t6 when the return time period End_Timelmt has elapsed from instant t5, the control system resets the hunting flag fHunt and the control pause flag fPAUSE (at steps S627-3 and S646). The control system sets the calculated correction torque dTw* as the correction torque command dTw_out* and outputs the thus-set correction torque dTw* as the correction torque command dTw_out* to the actuator.

At or after instant t6, the control system sets the hunting end elapsed time tHunt equal to a predetermined time Hunt_Timelmt (corresponding to a second predetermined time length T2), and outputs the correction torque command dTw_out* while monitoring reoccurrence or nonoccurrence of the hunting state. The output is returned to the normal time correction torque command in sufficient consideration of reoccurrence of the hunting state. Therefore, the control system can prevent reoccurrence of hunting and shorten the continuation of the lowered output state. The normal control is continued when the predetermined time Hunt_Timelmt has elapsed without detecting the hunting state in spite of outputting the correction torque command dTw_out*.

(When the Hunting State is Generated Again Before the Expiration of the Return Time Period after the End of the Last Hunting State)

Figure 19:
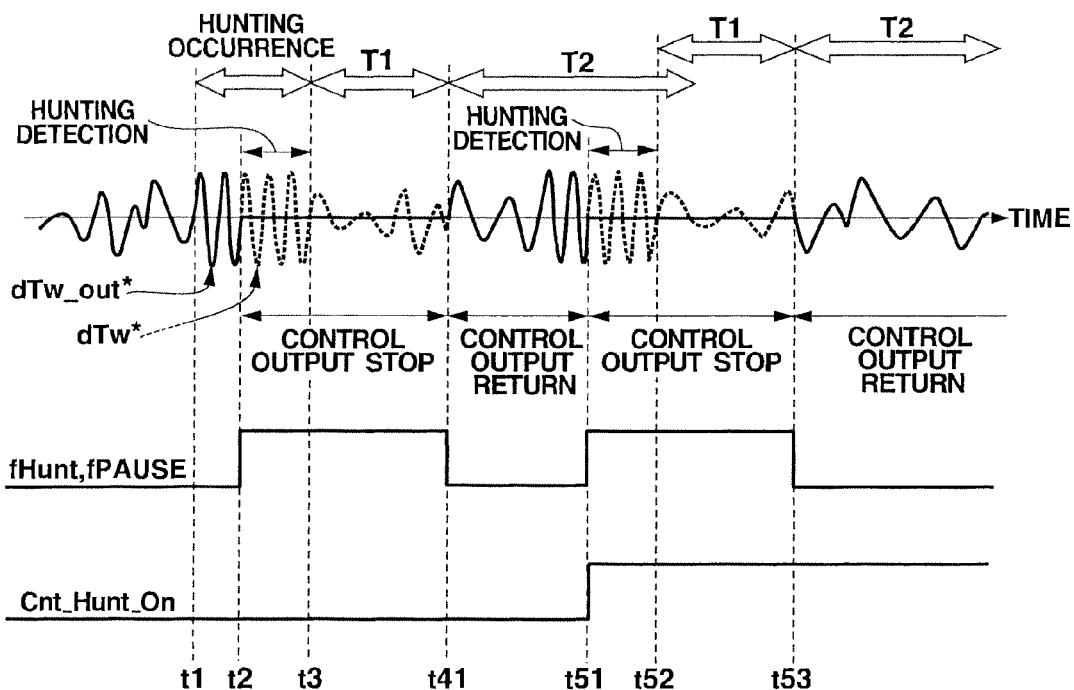
FIG. 19 is a time chart for illustrating operations when the vibration-damping control process according to the first embodiment is performed.

FIG. 19 illustrates, in the form of a time chart, operations of the vibration-damping control process according to the first embodiment. In the example of FIG. 19, the hunting state is generated in the correction torque command in the vibration-damping control in order to suppress vibrations produced in the vehicle during travel on a rough road. Because the time chart of FIG. 19 is the same as the time chart of FIG. 18 up until instant t3, so that explanation is omitted as to earlier time instants.

At an instant t41, when reoccurrence of the hunting is not detected until expiration of the return time period End_Timelmt from instant t3, the control system resets the hunting flag fHunt and the control pause flag fPAUSE, sets the hunting end elapsed time equal to the predetermined time Hunt_Timelmt (corresponding to the second predetermined time period T2), and outputs the correction torque command dTw_out* while monitoring reoccurrence or nonoccurrence of the hunting state.

At an instant t51, if the hunting state is generated again before the expiration of the predetermined time period Hunt_Timelmt, the control system sets the hunting flag fHunt and control pause flag fPAUSE again. In this case, since the hunting state is detected before the expiration of time period Hunt_Timelmt, which is the second predetermined time period T2, the hunting continuation count cnt_Hunt_On is increased by counting up.

At an instant t52, when it is judged that the hunting of correction torque dTw* has subsided, the control system sets the discontinuation return timer tHunt_End equal to the return time period End_Timelmt. Thereafter, if no hunting is generated, at an instant t53 after the expiration of the return time period, the control system resets the hunting flag fHunt and control pause flag fPAUSE again. The control system sets, as the correction torque command dTw_out*, the calculated correction torque dTw*, and outputs the thus-set correction torque dTw* as the correction torque command to the actuator.

If the hunting is detected within the predetermined time period Hunt_Timelmt (the second predetermined time period T2), the hunting continuation count cnt_Hunt_ON is increased by the counting up operation. When the hunting continuation count cnt_Hunt_ON reaches a predetermined continuation count number mHunt_cnt, the control pause flag fPAUSE is set to one, and the output is not resumed even if the hunting ends.

As explained above, the first embodiment can provide the following effects and advantages.

(1) A vibration damping control apparatus comprises: a driving force controlling means or device 60 and a braking force controlling means or device 70 (a driving/braking torque producing means or device) to produce a driving/braking torque in a wheel; a correction torque calculating means or device 54 to calculate a correction torque to suppress a vehicle body sprung vibration; a correction torque monitoring means or device 55 and a mode selecting or changeover means or device 56 (hereinafter referred to as a correction torque command outputting means or device) to output a correction torque command to the driving force controlling means 60 and the braking force controlling means 70 in accordance with the correction torque. The correction torque outputting means outputs a hunting time correction torque command smaller than a normal time correction torque command. Specifically, the hunting time correction torque command, which is small in amplitude (zero in the first embodiment), is outputted when a state in which an amplitude of the correction torque is greater than or equal to a predetermined amplitude continues for a hunting monitoring time period Cycle_Timelmt (a predetermined time length). The correction torque outputting means thereafter returns an output of the correction torque command from the hunting time correction torque command to the normal time correction torque command when a state in which the amplitude of the correction torque is smaller than or equal to the predetermined amplitude continues for a return time period End_Timelmt (a first predetermined time length). Moreover, the correction torque command outputting means continues the output of the hunting time correction torque command if the state in which the amplitude of the correction torque exceeds the predetermined amplitude continues for the hunting monitoring time period, but before elapse of the return time period End_Timelmt.

Thus, the vibration damping control apparatus restrains the occurrence of hunting with an output decrease of the correction torque against hunting generated temporarily by an external factor, such as a rough road. The vibration damping control apparatus is configured to cancel the output decrease when it is judged that the hunting is not generated in the calculated correction torque during the output decrease. Therefore, the vibration damping control apparatus can resume the control promptly after passage through a rough road and thereby prevent prolongation of the time during which the vibration damping control is inoperative. Additionally, when the hunting is generated continuously, the vibration damping control apparatus judges that the vehicle is running through a rough road and outputs the hunting time correction torque command continuously. Therefore, the vibration damping control apparatus can restrain reoccurrence of the hunting. The hunting time correction torque command is zero in the first embodiment. However, the hunting time correction torque is not limited to zero, and it is optional to employ an arrangement in which the hunting time correction torque command is set at a very small value having a very small absolute value, an arrangement in which the hunting time correction torque command is set equal to a predetermined constant control quantity, or an arrangement in which the hunting time correction torque command is set equal to a predetermined frequency control quantity. In any case, it is desirable to output the hunting time correction torque command capable of restraining the hunting with a predetermined control quantity.

(2) The correction torque outputting means outputs the hunting time correction torque command, which is set at zero, and does not return the output of the correction torque command to the normal time correction torque (the control stop flag fSTOP) even if the state in which the amplitude of the correction torque is smaller than or equal to the predetermined amplitude continues, when a condition in which the state in which the amplitude of the correction torque exceeds the predetermined amplitude continues for the predetermined time length is continued repetitively a number of times greater than a predetermined number after the elapse of the return time period End_Timelmt (the first time length), but before the elapse of the predetermined time period Hunt_Timelmt (the second time length T2) set at the hunting end elapsed time tHunt.

Thus, the vibration-damping control apparatus can restrain the frequency of occurrence of the hunting due to a factor on the vehicle's side, such as brake judder and shimmy, and reduce the unnatural feeling provided to the driver. When, on the other hand, the cause of the hunting is on the road surface's side, such as a rough road condition, the vibration damping control apparatus can stop the control during passage on the rough road and resume the control promptly after passage through the rough road. The above-mentioned "brake judder" is a phenomenon of transmission of vibrations produced between a brake pad and a brake rotor at the time of a brake pedal depression to the vehicle. The above-mentioned "shimmy" is a phenomenon of trembling movement of the steering wheel in the rotational direction caused by irregularities of the road surface, incorrect condition of the wheel balance, and backlash of the steering system.

(3) The hunting time correction torque command is set at a predetermined value of zero representing a stop of a control output. Therefore, the vibration-damping control apparatus can further reduce the unnatural feeling provided to the driver by the occurrence of hunting.

Embodiment 2

Figure 20:
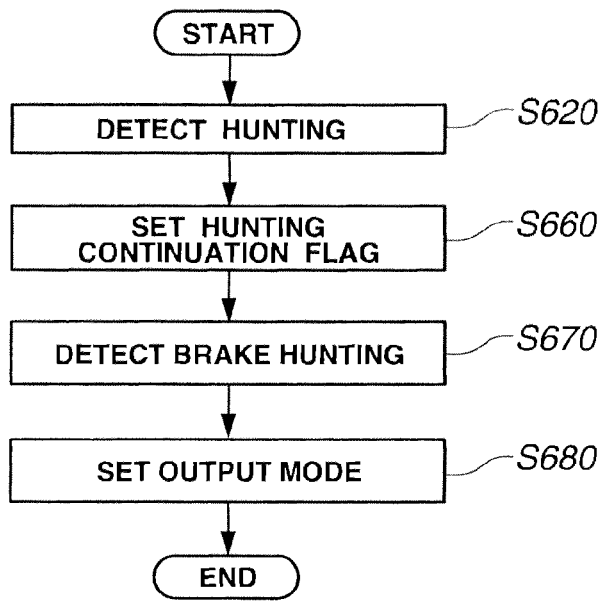
FIG. 20 is a flowchart showing an output mode setting process according to a second embodiment.

The following is an explanation of a second embodiment of the present invention. Since the basic construction is the same as that of the first embodiment, the explanation is directed only to points different from the first embodiment. FIG. 20 shows, in the form of a flowchart, a process, according to the second embodiment, of setting the output mode. A hunting detecting process at a step 620 is basically the same as that of the first embodiment, and hence explanation is omitted. The hunting monitoring time period Cycle_Timelmt set in the hunting monitoring timer tHunt_Cycle used in the hunting detecting process of the second embodiment is set shorter than the hunting monitoring time period Cycle_Timelmt according to the first embodiment. With this setting, the control system can quickly detect hunting at the time of detection of a brake operation, as hunting attributable to the vehicle's side, and thereby reduce the number of occurrences of hunting. The hunting at the time of detection of a brake operation is very likely to be hunting due to brake judder. Therefore, the setting of the hunting monitoring time period Cycle_Timelmt at a shorter time length is not problematical.

Figure 21:
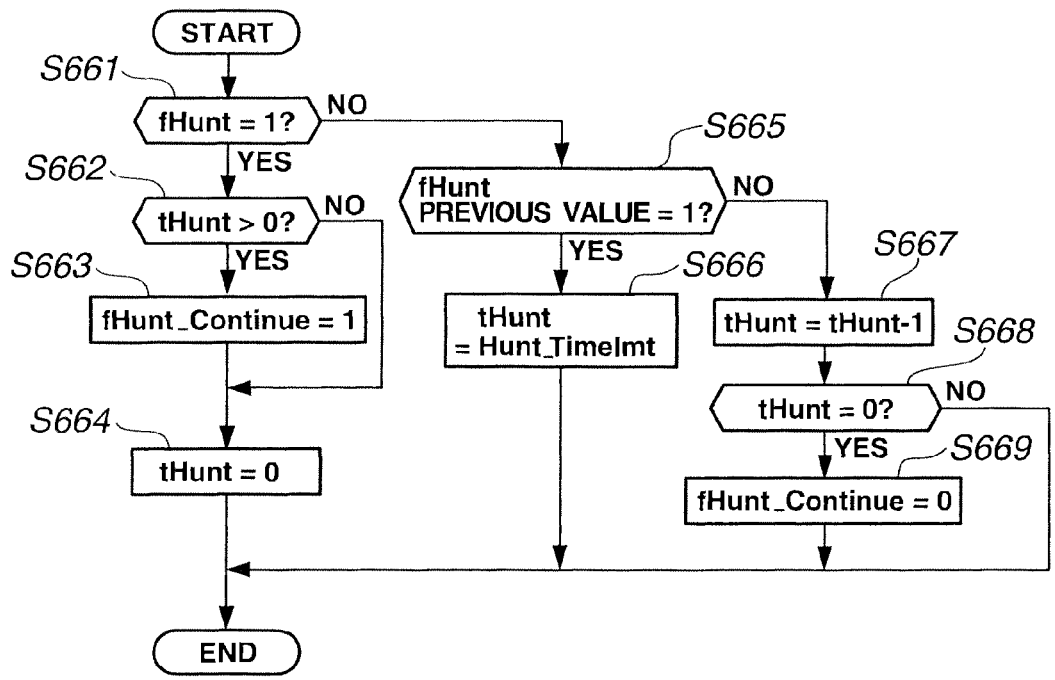
FIG. 21 is a flowchart showing steps in the vibration-damping control process in the controller according to the second embodiment.

At a step S660, the controller sets a hunting continuation flag in accordance with the hunting result detected at step S620. FIG. 21 is a flow chart showing the vibration-damping control process performed by the controller according to the second embodiment.

At a step S661, the controller examines whether the hunting flag fHunt is one or not. In the case of YES, the controller proceeds to a step S662, and examines whether the hunting end elapsed time tHunt is positive or not. In the case of YES, the controller proceeds to a step S663, and sets a hunting continuation flag fHunt_Continue to one according to the judgment that the hunting is continuing. In the case of NO, the controller proceeds directly to a step S664. At step S664, the controller clears the hunting end elapsed time tHunt, and then terminates the process of FIG. 21.

In the case of NO at step S661, the controller proceeds to a step S665, and determines whether the previous value of hunting flag fHunt is equal to one or not. In the case of YES, the controller proceeds to a step S666, and sets the hunting end elapsed time tHunt equal to a predetermined time length Hunt_Timelmt. In the case of NO at step S665, the controller proceeds to a step S667, and decreases by one the hunting end elapsed time tHunt. At a step S668, the controller examines whether the hunting end elapsed time tHunt is equal to zero or not. In the case of YES, the controller proceeds to a step S669, and clears the hunting continuation flag fHunt_Continue on the assumption that the continuation of the hunting ends. In the case of NO, the controller terminates the process directly.

At a step S670, the controller sets a brake operation time hunting flag in accordance with the hunting result detected at step S620 and the driver's brake operating condition read at step S100. The process of step S670 is explained by use of FIG. 22.

Figure 22:
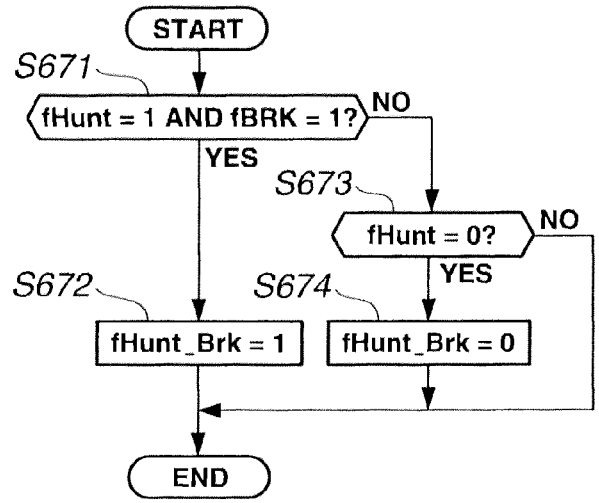
FIG. 22 is a flowchart showing a hunting flag setting process at the time of a brake operation, according to the second embodiment.

FIG. 22 is a flowchart showing the process of setting the hunting flag at the time of a brake operation according to the second embodiment.

At a step S671, the controller determines whether the hunting flag fHunt is one and a driver's brake operation flag fBRK is one, or not. In the case of YES, the controller proceeds to a step S672, and sets a brake hunting flag fHunt_Brk to one on the basis of the judgment that the hunting is a brake operation time hunting. In the case of NO, the controller determines whether the hunting flag fHunt is zero or not at a step S673. In the case of YES, the controller proceeds to a step S674, and clears the brake hunting flag fHunt_Brk on the basis of the judgment that the brake operation time hunting ends. In the case of NO at step S673, the controller terminates the process directly.

At a step S680, the controller sets the output mode in accordance with the hunting result detected at step S620 and the brake hunting flag fHunt_Brk set at step S670. The process performed at step S680 is explained by the use of FIG. 23.

Figure 23:
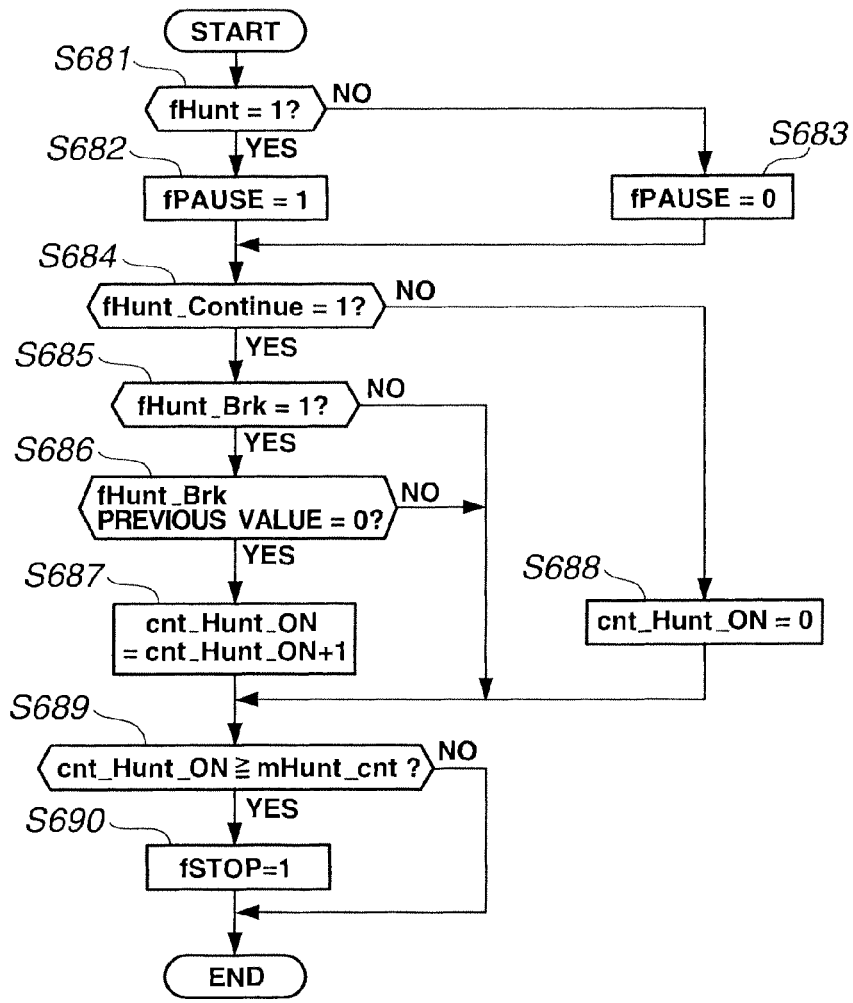
FIG. 23 is a flowchart showing the output mode setting process according to the second embodiment.

FIG. 23 is a flowchart showing the output mode setting process according to the second embodiment.

At a step S681, the controller examines whether the hunting flag fHunt is one or not. In the case of YES, the controller proceeds to a step S682, and sets the control pause or discontinuation flag fPAUSE to one on the basis of the judgment that the hunting state is present. In the case of NO, the controller proceeds to a step S683, and resets the control pause or discontinuation flag fPAUSE to zero on the basis of the judgment that the hunting state ends. At a step S684, the controller determines whether the hunting continuation flag fHunt_Continue is equal to one or not. In the case of YES, the controller proceeds to a step S685, and examines whether the hunting is a brake operation time hunting or not. In the case of YES, the controller proceeds to a step S686, and examines whether the previous value of brake hunting flag fHunt_Brk is zero or not. In the case of YES, the controller judges that hunting is generated again within the predetermined time length Hunt_Timelmt from the end of the hunting, and adds one to the hunting continuation count cnt_Hunt_On at a step S687.

In the case of NO at S685 or S686, the controller proceeds directly to step S689. In the case of NO at S684, the controller clears the hunting continuation count cnt_Hunt_On at a step S688, and then proceeds to step S689. At step S689, the controller determines whether the hunting continuation count cnt_Hunt_On is greater than or equal to the predetermined continuation count mHunt_cnt. In the case of NO, the controller terminates the process directly. In the case of YES, the controller sets the control stop flag fSTOP to one at a step S690 since the brake operation time hunting has generated the predetermined number of times mHunt_cnt within the predetermined time length Hunt_Timelmt from the end of the hunting. When the control stop flag fSTOP is set at one, the output is not resumed even if the hunting ends.

As explained above, the second embodiment can provide the following effects and advantages in addition to the effects (1)-(3) of the first embodiment.

(4) The vibration-damping control apparatus further comprises a brake operation sensing section 30 (a brake operation sensing means) for sensing a brake operation. The correction torque outputting means is configured to output the hunting time correction torque command at zero. The correction torque outputting means does not return the output of the correction torque command to the normal time correction torque (the control stop flag fSTOP) even if the state in which the amplitude of the correction torque is smaller than or equal to the predetermined amplitude continues, when the state in which the amplitude of the correction torque continues to be greater than or equal to the predetermined amplitude for a predetermined time length and the brake operation is performed is continued repetitively a plurality of times so that the number of times is greater than the predetermined number within the predetermined time length Hunt_Timelmt (second time length T2) set at the hunting end elapsed time tHunt.

Thus, the vibration-damping control apparatus is configured to decrease or stop the control output and to prevent the return or resumption of the output even if the hunting has subsided in the case that the hunting during the brake operation is continued or repeated a plurality of times greater than the predetermined number of times. Therefore, the vibration-damping control apparatus can discern the factor on the vehicle side for causing hunting during a driver's operation, such as brake judder, securely.

(5) The hunting monitoring time period Cycle_Timelmt is made shorter in the state in which the brake operation is performed than in the state in which the brake operation is not performed (cf. the first embodiment).

Therefore, the vibration-damping control apparatus can determine the occurrence of hunting due to brake judder quickly, and thereby stop the damping control earlier.

Embodiment 3

Figure 24:
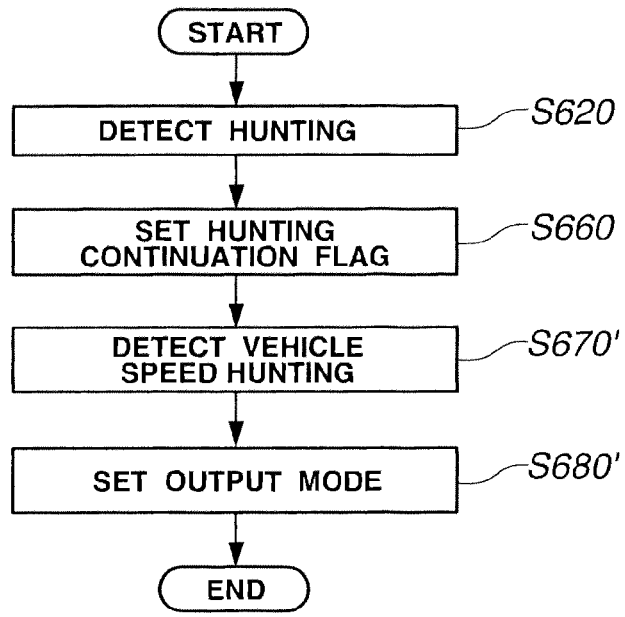
FIG. 24 is a flowchart showing an output mode setting process according to a third embodiment.

The following is an explanation of a third embodiment of the present invention. Since the basic construction is the same as that of the second embodiment, the explanation is directed only to points different from the preceding embodiment. FIG. 24 shows, in the form of a flowchart, an output mode setting process according to the third embodiment. Since steps S620 and S660 are the same as those of the second embodiment, the explanation is directed only to a different step S670'. The hunting monitoring time period Cycle_Timelmt set in the hunting monitoring timer tHunt_Cycle used in the hunting detecting process of the second embodiment is set shorter than the hunting monitoring time period Cycle_Timelmt according to the first embodiment. With this setting according to the third embodiment, the control system can quickly detect hunting at the time of detection of shimmy as hunting attributable to the vehicle's side, quickly, and thereby reduce the number of occurrences of hunting. The hunting at the time of detection of shimmy is very likely to be hunting due to shimmy. Therefore, the setting of the hunting monitoring time period Cycle_Timelmt at a shorter time length is not problematical.

At step S670', the controller sets a hunting flag in a predetermined speed region, in accordance with the hunting result detected at step S620 and the vehicle speed V of the vehicle equipped with this control system. The vehicle speed V can be determined from the wheel speeds of the two rear wheels VwRR and VwRL, for example. The process performed at step S670' is explained with reference to FIG. 25.

Figure 25:
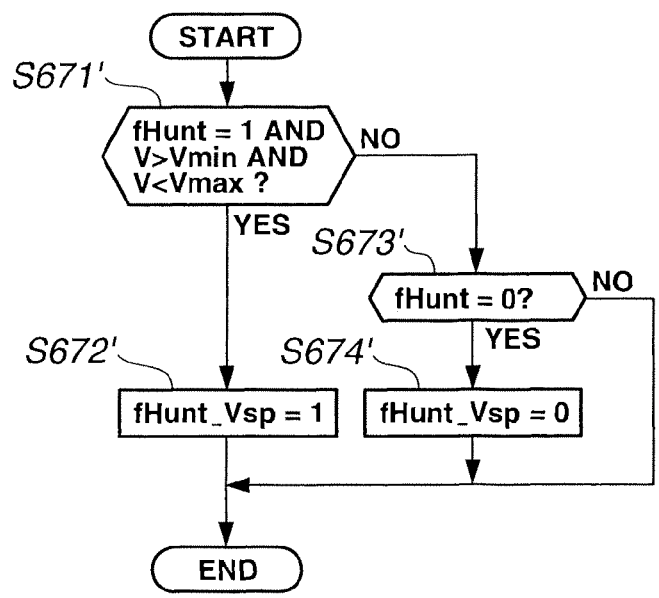
FIG. 25 is a flowchart showing a hunting flag setting process in a predetermined vehicle speed region.

FIG. 25 is a flowchart showing the process of setting the hunting flag in the predetermined vehicle speed region, according to the third embodiment.

At a step S671', the controller determines whether the hunting flag fHunt is equal to one, the vehicle speed V is higher than a predetermined value Vmin and the vehicle speed V is lower than a predetermined value Vmax. In the case of YES, the controller proceeds to a step S672'. At step S672', the controller judges that the hunting is a hunting in a predetermined vehicle speed region, and sets a predetermined vehicle speed region hunting flag fHunt_Vsp at one. In the case of NO, the controller examines, at a step S673', whether the hunting flag fHunt is equal to zero or not. In the case of YES, the controller proceeds to a step S674', judges that the hunting in the predetermined speed region ends and clears the predetermined vehicle speed region hunting flag fHunt_Vsp. In the case of NO at step S673', the controller terminates the process directly.

Figure 26:
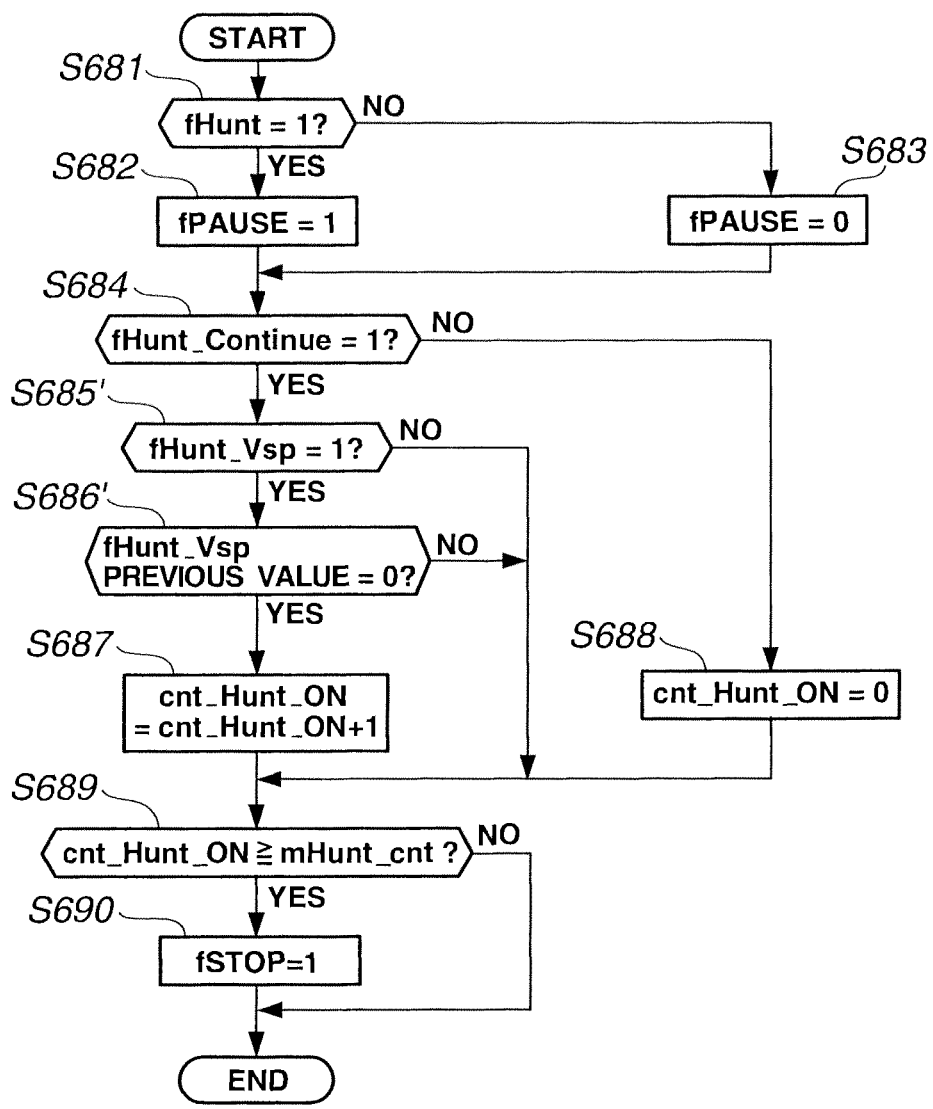
FIG. 26 is a flowchart showing the output mode setting process according to the third embodiment.

At a step S680', the controller sets the output mode in accordance with the hunting result detected at step S620 and the predetermined vehicle speed region hunting flag fHunt_Vsp set at step S670'. The process performed at step S680' is explained by use of FIG. 26.

At a step S681, the controller examines whether the hunting flag fHunt is one or not. In the case of YES, the controller proceeds to a step S682, and sets the control pause or discontinuation flag fPAUSE to one on the assumption that the hunting state is present. In the case of NO, the controller proceeds to a step S683, and resets the control pause flag fPAUSE to zero on the assumption that the hunting state ends.

At a step S684, the controller determines whether the hunting continuation flag fHunt_Continue is equal to one or not. In the case of YES, the controller proceeds to a step S685', and examines whether the hunting is a predetermined vehicle speed region hunting or not. In the case of YES, the controller proceeds to a step S686', and examines whether the previous value of predetermined vehicle speed region hunting flag fHunt_Vsp is zero or not. In the case of YES, the controller judges that the hunting is generated again within the predetermined time length Hunt_Timelmt from the end of the hunting, and adds one to the hunting continuation count cnt_Hunt_On at step S687.

As explained above, the third embodiment can provide the following effects and advantages in addition to the is effects (1)-(3) of the first embodiment.

(6) The vibration-damping control apparatus further comprises a wheel speed sensor 10 for sensing a vehicle speed (a vehicle speed sensing means). The correction torque outputting means is configured to output the hunting time correction torque command (equal to zero in the third embodiment) and to refrain from returning the output to the normal time correction torque even if the state in which the amplitude of the correction torque dTw* is smaller than or equal to the predetermined amplitude continues, when the state in which the sensed vehicle speed V is in the range of Vmin<V<Vmax (a predetermined vehicle speed region) and the amplitude of the correction torque dTw* continues to be greater than or equal to the predetermined amplitude is continued repetitively a plurality of times so that the number of times is greater than the predetermined number within a predetermined time period Hunt_Timelmt (the second time length T2) set at the hunting end elapsed time tHunt.

Therefore, the vibration-damping control apparatus can securely discern the factor on the vehicle side for causing hunting during driving at a specified vehicle speed, such as shimmy, and thereby prevent unnatural feeling of repetition of hunting at the time of resumption of the control.

(7) The hunting monitoring time period Cycle_Timelmt is set shorter when the sensed vehicle speed in the range of Vmin<V<Vmax (the predetermined vehicle speed region) than when V≤Vmin or V≥Vmax.

Therefore, the vibration-damping control apparatus can detect the hunting due to shimmy etc., quickly, and thereby stop the vibration-damping control earlier.

Although explanation is given to the embodiments in which the present invention is applied to a vibration-damping or vibration-suppressing apparatus, various other constructions are included in the present invention. For example, the driving source of the driving/braking torque producing means or device is not limited to the engine, and the vehicle may be a hybrid vehicle including a motor, or an electric vehicle using only a motor as the driving source although the embodiments employ the construction equipped with the engine that is an internal combustion engine as the driving source of the driving/braking torque producing means or device.

Moreover, as a brake actuator of the driving/braking torque producing means or device, the illustrated construction is arranged to produce a braking force by pressing a caliper with a brake pad. However, it is optional to utilize a regenerative braking force of a motor or the like. Furthermore, instead of a hydraulic brake, it is possible to employ a construction including an electric caliper. In the case of the electric vehicle including a motor/generator, the driving/braking torque producing means or device includes only the motor/generator. Therefore, it is possible to output a signal combining the driving torque and braking torque in the form of a torque signal supplied to the motor/generator.

The illustrated embodiments employ the construction using the front and rear two-wheel model having the front and rear suspensions with respect to the vehicle body, and calculating the correction torque to suppress pitching vibration and bouncing vibration of the vehicle. However, for example, it is possible to employ the construction using a four-wheel model, and calculating the correction torque to suppress rolling vibration as well as the pitching vibration and bouncing vibration.

The invention claimed is:

1. A vehicular vibration damping control apparatus for a vehicle, comprising:
a driving/braking torque producing means for producing a driving/braking torque of a wheel; and
a controlling means for:
calculating a correction torque to suppress a vehicle body spring vibration of the vehicle,
outputting a non-hunting correction torque command in accordance with the correction torque to the driving/braking torque producing means,
outputting a hunting time correction torque command smaller than a non-hunting time correction torque command to the driving/braking torque producing means when a state in which an amplitude of the correction torque is greater than a predetermined amplitude continues for a given predetermined time length,
returning to output the non-hunting time correction torque command from the hunting time correction torque command to the driving/braking torque producing means when a state in which the amplitude of the correction torque is smaller than or equal to the predetermined amplitude continues for a first predetermined time length,
continuing to output the hunting time correction torque command to the driving/braking torque producing means when the state in which the amplitude of the correction torque is greater than the predetermined amplitude continues for the given predetermined time length before elapse of the first predetermined time length, and
outputting the hunting time correction torque command to the driving/braking torque producing means and preventing the returning to output the non-hunting time correction torque, even when the state in which the amplitude of the correction torque is smaller than or equal to the predetermined amplitude continues, when a condition in which the state in which the amplitude of the correction torque is greater than the predetermined amplitude continues for the given predetermined time length is continued a number of times which is greater than a predetermined number after the elapse of the first predetermined time length and before elapse of a second predetermined time length.

2. The vibration damping control apparatus as claimed in claim 1, further comprising a brake operation sensing means for sensing a brake operation; and
wherein the controlling means is configured to output the hunting time correction torque command and does not return to outputting the non-hunting time correction torque, even when the state in which the amplitude of the correction torque is smaller than or equal to the predetermined amplitude continues, when a state in which the amplitude of the correction torque continues to be greater than the predetermined amplitude for the given predetermined time length and the brake operation is performed is continued a number of times greater than the predetermined number within the second predetermined time length.

3. The vibration damping control apparatus as claimed in claim 2, wherein the given predetermined time length is set to be shorter in a state in which the brake operation is performed than in a state in which the brake operation is not performed.

4. The vibration damping control apparatus as claimed in claim 1, further comprising a vehicle speed sensing means for sensing a vehicle speed; and
wherein the controlling means is configured to output the hunting time correction torque command and does not return to output the non-hunting time correction torque, even when the state in which the amplitude of the correction torque is smaller than or equal to the predetermined amplitude continues, when a state in which the amplitude of the correction torque continues to be greater than the predetermined amplitude within a predetermined vehicle speed region of the sensed vehicle speed is continued for the number of times greater than the predetermined number within the second predetermined time length.

5. The vibration damping control apparatus as claimed in claim 4, wherein the given predetermined time length is set to be shorter within the predetermined vehicle speed region of the sensed vehicle speed than without the predetermined vehicle speed region of the sensed vehicle speed.

6. The vibration damping control apparatus as claimed in claim 1, wherein the hunting time correction torque command is set at a predetermined value representing a stop of a control output.

7. A vehicular vibration damping control apparatus for a vehicle, comprising:
at least one of a driving torque producing device configured to produce a driving torque of a wheel and a braking torque producing device for producing a braking torque of the wheel; and
a controller configured to:
calculate a correction torque to suppress a vehicle body spring vibration of the vehicle,
output a non-hunting correction torque command in accordance with the correction torque to the one of the driving torque producing device and the braking torque producing device,
output a hunting time correction torque command smaller than a non-hunting time correction torque command to the one of the driving torque producing device and the braking torque producing device when a state in which an amplitude of the correction torque is greater than a predetermined amplitude continues for a given predetermined time length,
return to output the non-hunting time correction torque command from the hunting time correction torque command to the one of the driving torque producing device and the braking torque producing device when a state in which the amplitude of the correction torque is smaller than or equal to the predetermined amplitude continues for a first predetermined time length,
continue to output the hunting time correction torque command to the one of the driving torque producing device and the braking torque producing device when the state in which the amplitude of the correction torque is greater than the predetermined amplitude continues for the given predetermined time length before elapse of the first predetermined time length, and
output the hunting time correction torque command to the one of the driving torque producing device and the braking torque producing device and prevent the returning to output the non-hunting time correction torque, even when the state in which the amplitude of the correction torque is smaller than or equal to the predetermined amplitude continues, when a condition in which the state in which the amplitude of the correction torque is greater than the predetermined amplitude continues for the given predetermined time length is continued a number of times which is greater than a predetermined number after the elapse of the first predetermined time length and before elapse of a second predetermined time length.

8. The vibration damping control apparatus as claimed in claim 7, further comprising a brake operation sensor configured to sense a brake operation; and
wherein the controller is configured to output the hunting time correction torque command and does not return to outputting the non-hunting time correction torque, even when the state in which the amplitude of the correction torque is smaller than or equal to the predetermined amplitude continues, when a state in which the amplitude of the correction torque continues to be greater than the predetermined amplitude for the given predetermined time length and the brake operation is performed is continued a number of times greater than the predetermined number within the second predetermined time length.

9. The vibration damping control apparatus as claimed in claim 8, wherein the given predetermined time length is set to be shorter in a state in which the brake operation is performed than in a state in which the brake operation is not performed.

10. The vibration damping control apparatus as claimed in claim 7, further comprising a vehicle speed sensor configured to sense a vehicle speed; and
wherein the controller is configured to output the hunting time correction torque command and does not return to output the non-hunting time correction torque, even when the state in which the amplitude of the correction torque is smaller than or equal to the predetermined amplitude continues, when a state in which the amplitude of the correction torque continues to the greater than the predetermined amplitude within a predetermined vehicle speed region of the sensed vehicle speed is continued for the number of times greater than the predetermined number within the second predetermined time length.

11. The vibration damping control apparatus as claimed in claim 10, wherein the given predetermined time length is set to be shorter within the predetermined vehicle speed region of the sensed vehicle speed than without the predetermined vehicle speed region of the sensed vehicle speed.

12. The vibration damping control apparatus as claimed in claim 7, wherein the hunting time correction torque command is set at a predetermined value representing a stop of a control output.

13. The vibration damping control apparatus as claimed in claim 7, wherein the at least one of a driving torque producing device and a braking torque producing device comprises both the driving torque producing device and the braking torque producing device.

\* \* \* \* \*